(12) United States Patent
Yano et al.

(10) Patent No.: US 8,266,396 B2
(45) Date of Patent: Sep. 11, 2012

(54) MEMORY SYSTEM COMPRISING BLOCKS OPERABLE IN PARALLEL

(75) Inventors: Hirokuni Yano, Tokyo (JP); Hiroshi Yao, Kanagawa (JP); Hajime Yamazaki, Saitama (JP); Tatsuya Sumiyoshi, Kanagawa (JP); Yoshimi Niisato, Kanagawa (JP); Takahiro Totsuka, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 78 days.

(21) Appl. No.: 12/884,844

(22) Filed: Sep. 17, 2010

(65) Prior Publication Data

US 2011/0231610 A1    Sep. 22, 2011

(30) Foreign Application Priority Data

Mar. 17, 2010  (JP) ................... 2010-061181

(51) Int. Cl.
*G06F 12/00* (2006.01)
(52) U.S. Cl. ......... 711/158; 711/103; 711/118; 711/170
(58) Field of Classification Search .................. None
See application file for complete search history.

(56) References Cited

U.S. PATENT DOCUMENTS

| | | |
|---|---|---|
| 2010/0037009 A1 | 2/2010 | Yano et al. |
| 2010/0049907 A1 | 2/2010 | Kitsunai et al. |
| 2010/0077266 A1 | 3/2010 | Kanno et al. |
| 2010/0161885 A1 | 6/2010 | Kanno et al. |
| 2010/0169549 A1 | 7/2010 | Yano et al. |
| 2010/0169551 A1 | 7/2010 | Yano et al. |
| 2010/0169553 A1 | 7/2010 | Yano et al. |
| 2010/0169597 A1 | 7/2010 | Yonezawa et al. |

FOREIGN PATENT DOCUMENTS

JP    2007-199905    8/2007

OTHER PUBLICATIONS

U.S. Appl. No. 13/326,872, filed Dec. 15, 2011, Hirao, et al.
U.S. Appl. No. 13/328,471, filed Dec. 16, 2011, Yano, et al.
U.S. Appl. No. 13/052,146, filed Mar. 21, 2011, Ootsuka, et al.
U.S. Appl. No. 12/529,282, filed Nov. 9, 2009.
U.S. Appl. No. 13/209,029, filed Aug. 12, 2011, Yamazaki, et al.
U.S. Appl. No. 13/237,396, filed Sep. 20, 2011, Morita.
U.S. Appl. No. 13/063,255, filed Mar. 10, 2011, Yano, et al.
U.S. Appl. No. 13/063,210, filed May 25, 2011, Yano, et al.

*Primary Examiner* — Shawn X Gu
(74) *Attorney, Agent, or Firm* — Oblon, Spivak, McClelland, Maier & Neustadt, L.L.P.

(57) ABSTRACT

According to one embodiment, a free blocks included in a nonvolatile semiconductor memory are classified into a plurality of free block management lists. When a free block is acquired at normal priority, the free block is acquired from the free block management list in which a number of free blocks is larger than a first threshold. When a free block is acquired at high priority, the free block is acquired from the free block management list irrespective of the first threshold.

23 Claims, 16 Drawing Sheets

FIG. 8
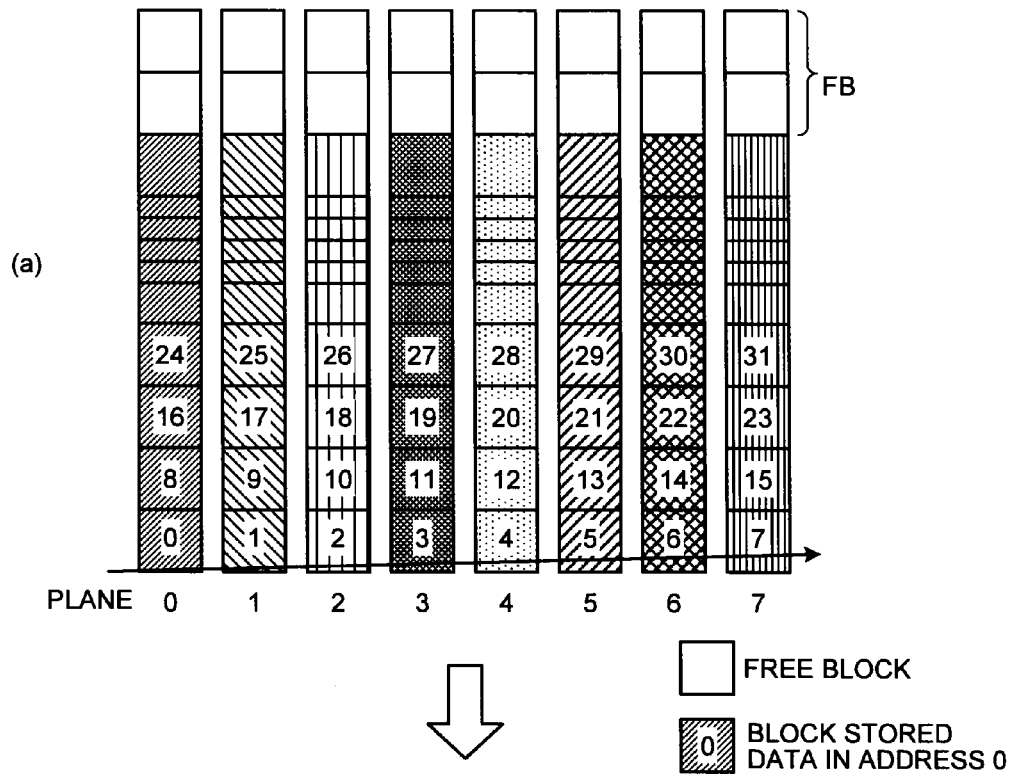
(a) Step 1: TOTAL SEQUENTIAL WRITE
☐ FREE BLOCK
▨0▨ BLOCK STORED DATA IN ADDRESS 0
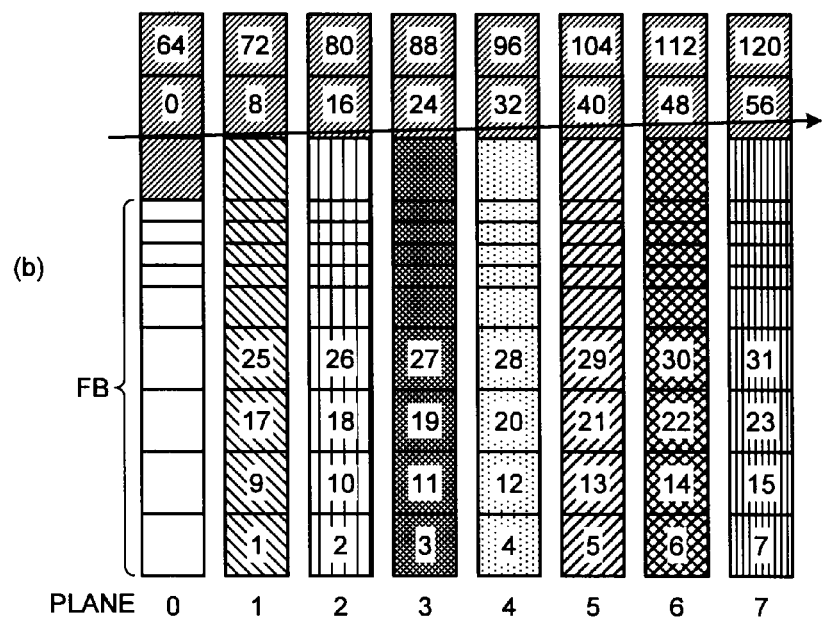
(b) Step 2: OVERWRITE BLOCKS OF SPECIFIC PLANE

MEMORY SYSTEM COMPRISING BLOCKS OPERABLE IN PARALLEL

CROSS-REFERENCE TO RELATED APPLICATIONS

This application is based upon and claims the benefit of priority from the prior Japanese Patent Application No. 2010-061181, filed on Mar. 17, 2010; the entire contents of which are incorporated herein by reference.

FIELD

Embodiments described herein relate generally to a memory system including a nonvolatile semiconductor memory.

BACKGROUND

A memory system including a NAND flash memory drives a plurality of chips in parallel to improve transfer performance.

As one kind of performance required of the NAND flash memory, there is data transfer performance during sequential write (hereinafter, "sequential write performance"). The sequential write is writing in which logical addresses designated by a host apparatus are basically consecutive. To improve the sequential write performance, it is important to increase the number of parallel writings as much as possible by, for example, simultaneously driving a plurality of chips.

BRIEF DESCRIPTION OF THE DRAWINGS

FIGS. 8A and 8B are conceptual diagrams of the dynamic block allocation system according to the comparative example;

DETAILED DESCRIPTION

In general, according to one embodiment, a block selecting unit classifies free blocks included in a nonvolatile semiconductor memory into a plurality of free block management lists using a set unit of blocks operable in parallel. A first free-block selecting unit acquires, in acquiring the free blocks at normal priority, the free blocks from the free block management list in which the number of free blocks is larger than a first threshold. A second free-block selecting unit acquires, in acquiring the free blocks at high priority, the free blocks from the free block management list in which the number of free blocks is larger than the first threshold and the free block management list in which the number of free blocks is not larger than the first threshold.

Exemplary embodiments of a memory system will be explained below in detail with reference to the accompanying drawings. The present invention is not limited to the following embodiments.

In some case, the NAND flash memory adopts a logical to physical translation system for dynamically associating, every time data update is performed, a logical address of data designated by a host apparatus and a physical address as an actual storage region on the NAND flash memory. In the logical to physical translation system, free blocks are classified into a plurality of blocks and the free blocks are selected from the groups in a combination writable in parallel to realize parallel processing. However, depending on an address of the data designated by the host apparatus, because the selection concentrates on the blocks in a specific group, all the blocks in the group are exhausted. As a result, the free blocks cannot be selected in the combination writable in parallel and it is likely that parallelism is deteriorated.

Figure 1:
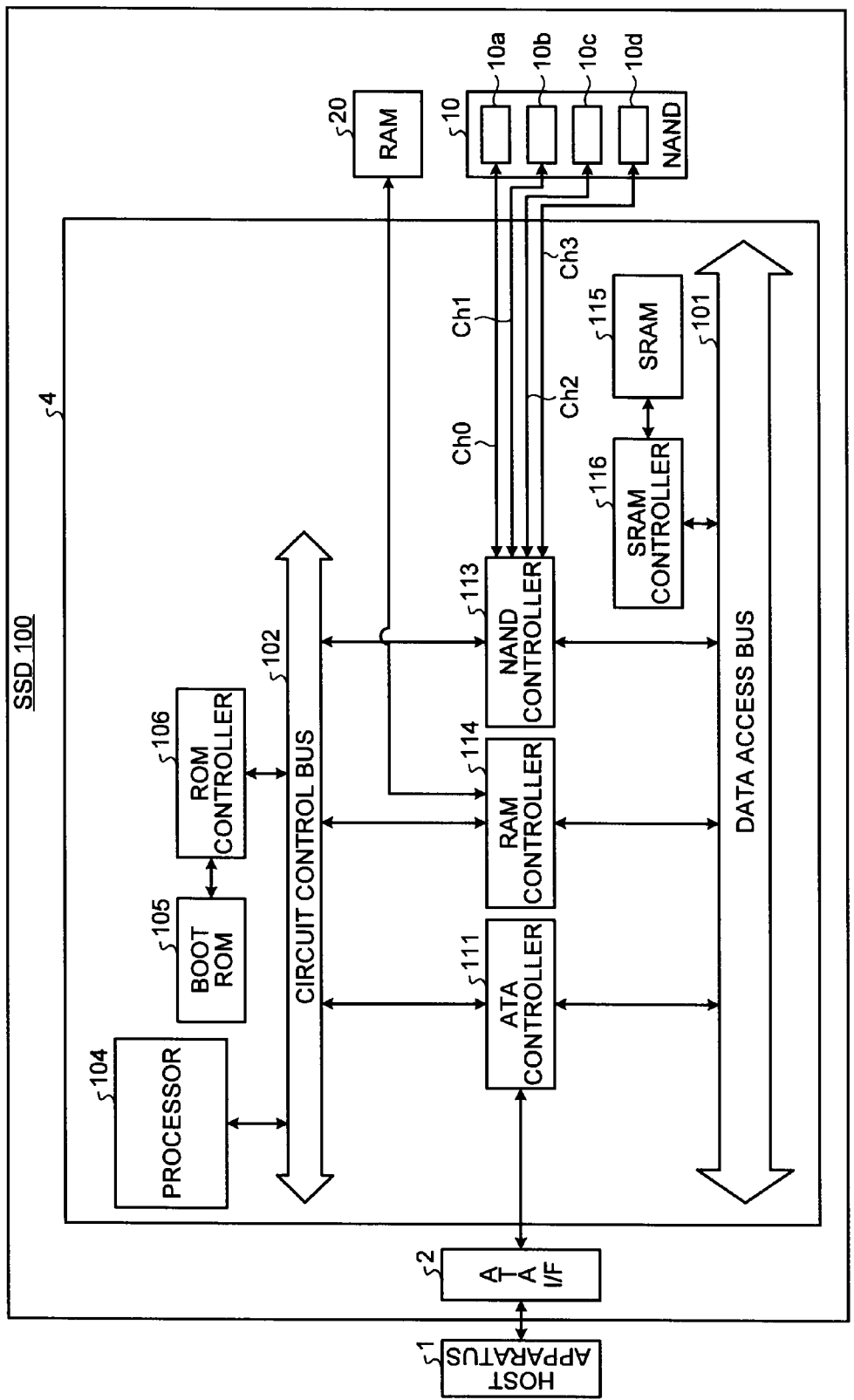
FIG. 1 is a block diagram of an example of the configuration of a solid state disk (SSD)

FIG. 1 is a block diagram of an example of the configuration of a solid state drive (SSD) 100 as an example of the memory system. The SSD 100 includes a drive control circuit 4 as an SSD controller, a NAND flash memory (hereinafter abbreviated as "NAND memory") 10 as a nonvolatile semiconductor memory, a random access memory (RAM) 20 including, for example, a volatile semiconductor memory functioning as a buffer memory, a work memory area, or the like, and a memory connection interface such as an ATA interface (ATA I/F) 2. The SSD 100 is connected to a host apparatus (hereinafter abbreviated as "host") 1 such as a personal computer or a central processing unit (CPU) core via the ATA I/F 2 and functions as an external memory of the host 1.

The NAND memory 10 stores user data designated by the host 1 and stores, for backup, management information managed in the RAM 20. The NAND memory 10 has a memory cell array in which a plurality of memory cells are arrayed in a matrix shape. Each of the memory cells can store multiple values using a higher order page and a lower order page. The NAND memory 10 includes a plurality of memory chips. Each of the memory chips is configured by arraying a plurality of physical blocks as a unit of data erasing. In the NAND memory 10, writing of data and readout of data are performed for each of physical pages. Each of the physical blocks includes a plurality of physical pages. In FIG. 1, the NAND memory 10 is connected to a NAND controller 113 in the drive control circuit 4 via four channels (4 ch: ch0 to ch1) in parallel. Four channel parallel operation elements 10a to 10d can be caused to operate in parallel. The number of channels is not limited to four and an arbitrary number of channels can be adopted.

The RAM 20 is used as a storing unit for data transfer, management information recording, or a work area. Specifically, as the storing unit for data transfer (a buffer for data transfer), the RAM 20 is used for temporarily storing data, writing of which is requested by the host 1, before writing the data in the NAND memory 10 or used for reading out data, readout of which is requested by the host 1, from the NAND memory 10 and temporarily storing the data. As the storing unit for management information recording, the RAM 20 is used for storing management information for managing a storage location or the like of data stored in the NAND memory 10 (management tables obtained by expanding various management tables stored in the NAND memory 10 during starting, a log as change difference information of the management tables, etc.).

The drive control circuit 4 performs data transfer control between the host 1 and the NAND memory 10 via the RAM 20 and controls the components in the SSD 100.

The drive control circuit 4 includes a data access bus 101 and a circuit control bus 102. A processor 104 that controls the entire drive control circuit 4 is connected to the circuit control bus 102. A boot ROM 105 having stored therein a boot program for booting management programs (firmware (FW)) stored in the NAND memory 10 is connected to the circuit control bus 102 via a ROM controller 106.

An ATA interface controller (an ATA controller) 111, the NAND controller 113, and a RAM controller 114 are connected to both the data access bus 101 and the circuit control bus 102. The ATA controller 111 transmits and receives commands (write, read, flush, etc.), data, and the like to and from the host 1 via the ATA interface 2. A static random access memory (SRAM) 115 used as a data work area and a firmware expansion area is connected to the data access bus 101 via an SRAM controller 116. The firmware stored in the NAND memory 10 is transferred to the SRAM 115 by the boot program stored in the boot ROM 105 during starting.

The RAM controller 114 executes interface processing between the processor 104 and the RAM 20. The NAND controller 113 executes interface processing between the processor 104 and the NAND memory 10, data transfer control between the NAND memory 10 and the RAM 20, encode/decode processing for an error correction code, and the like.

Figure 2:
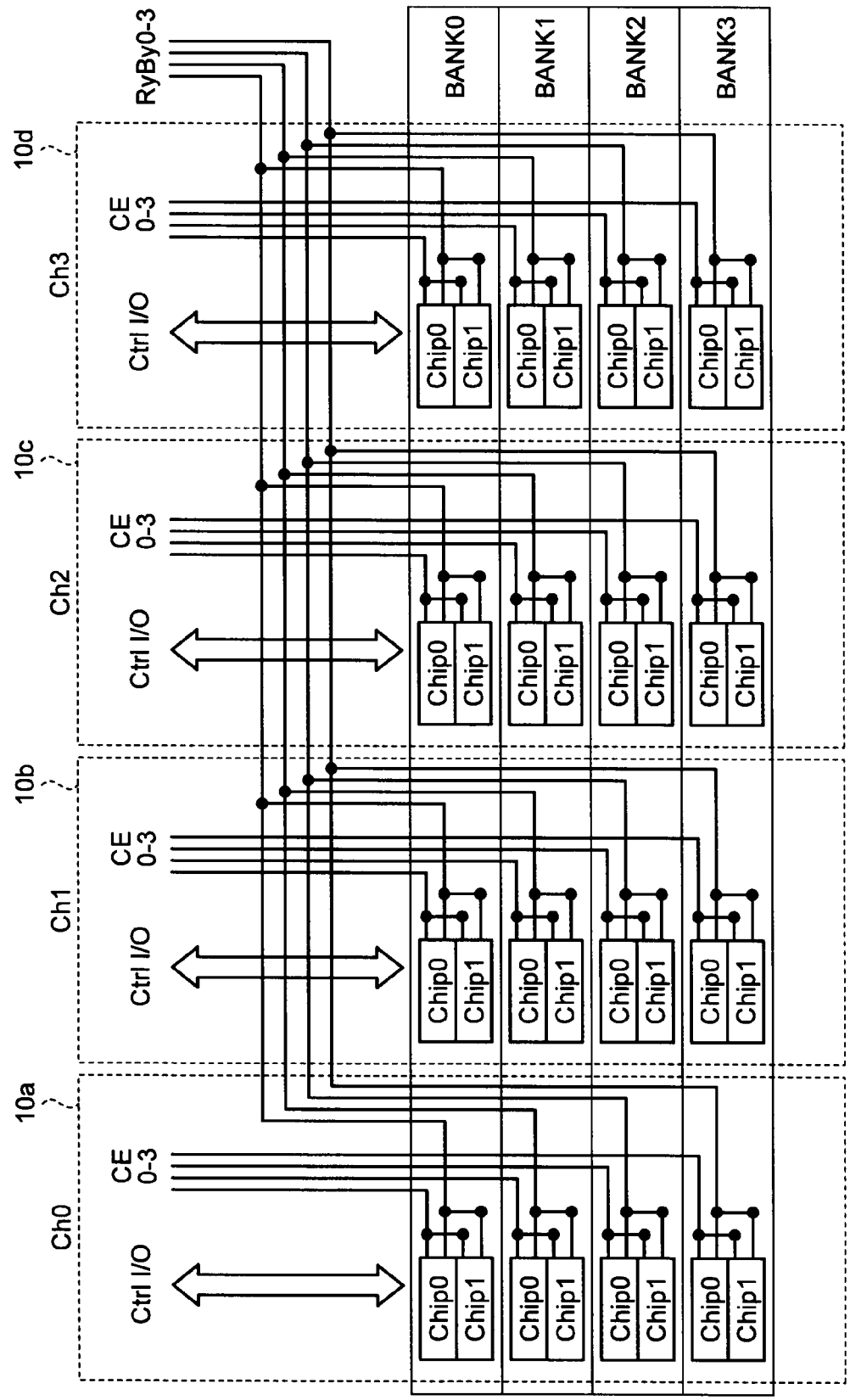
FIG. 2 is a diagram of a form of connection between a NAND controller and a NAND memory.

FIG. 2 is a diagram of a form of connection between the NAND controller 113 and the NAND memory 10. As explained above, the NAND memory 10 includes the channel parallel operation elements 10a to 10d. Each of the channel parallel operation elements 10a to 10d includes a plurality of banks (in FIG. 2, four banks Bank0 to Bank3) that can be bank-interleaved. Each of the banks in the channel parallel operation elements 10a to 10d includes a plurality of memory chips (in FIG. 2, two memory chips Chip0 and Chip1).

As shown in FIG. 2, the NAND controller 113 has a plurality of channels. In each of the channels, the NAND controller 113 separately controls, with four chip enable signals (CE), the memory chips that share a control I/O signal (Ctrl I/O) for each of the banks. The NAND controller 113 shares four ready/busy signals (RyBy) over the channels and performs control such that the memory chips of the channels that share the ready/busy signals (RyBy) simultaneously operate. Memory chip groups that share the ready/busy signals (RyBY) are referred to as banks. The respective banks can independently perform writing, readout, and erasing operations.

Figure 3:
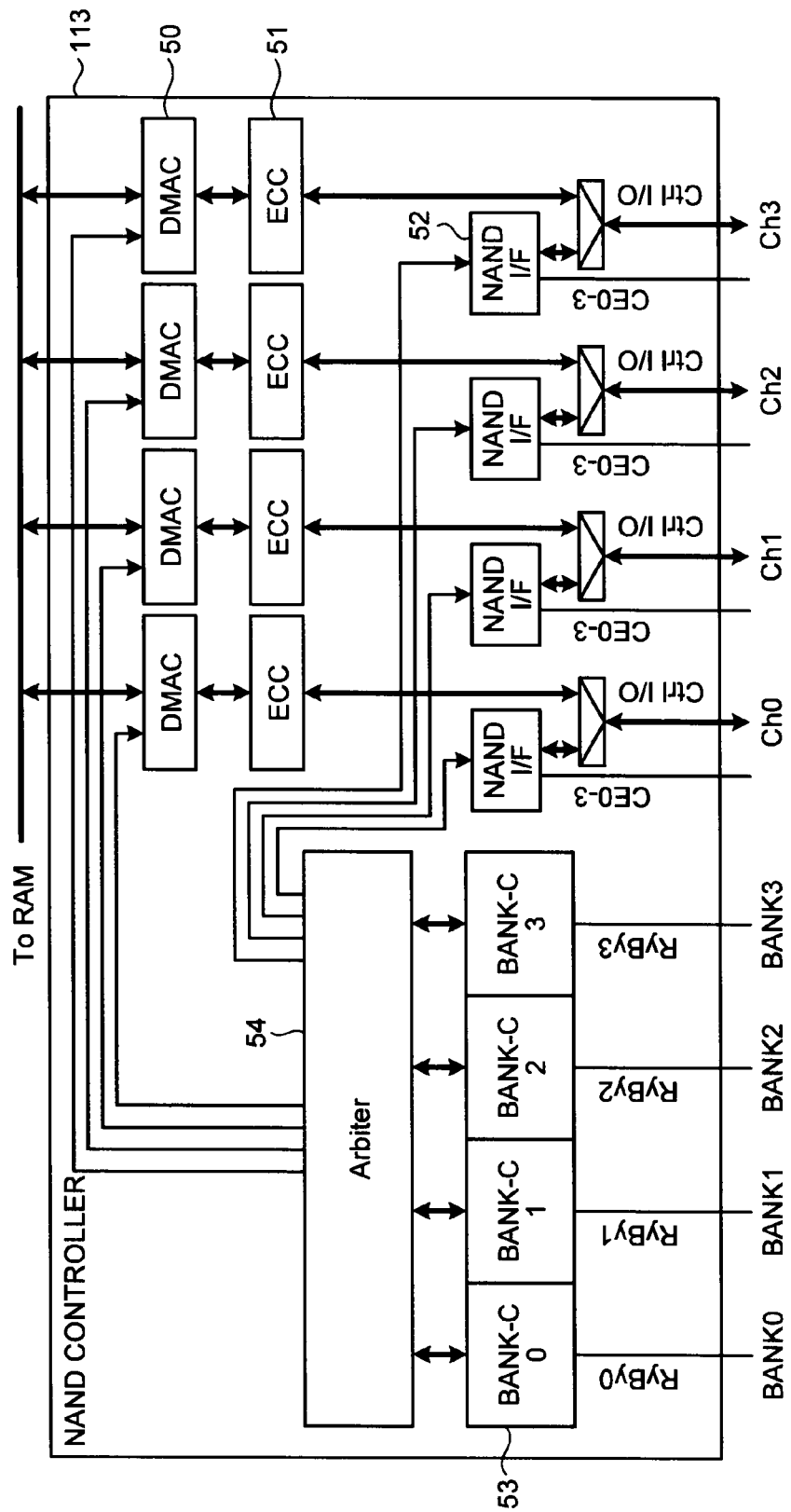
FIG. 3 is a block diagram of an example of an internal configuration of the NAND controller.

FIG. 3 is a diagram of an example of an internal configuration of the NAND controller 113. To cause the channels to independently operate, the NAND controller 113 includes, for the respective channels, DMA controllers (DMACs) 50, error correction circuits (ECCs) 51, and NAND interfaces (NAND I/Fs) 52 that perform command issuance. Chip enable signals CE (CE0 to CE3) for four banks are connected to each of the NAND I/Fs 52. The NAND controller 113 controls the CE signals (CE0 to CE3) according to a bank to be accessed. To cause the four banks to independently operate, the NAND controller 113 includes four bank controllers (BANK-Cs) 53 that monitor the RyBy signals connected in common to each of the banks and manage states of the banks. The BANK-Cs 53 have a function of queuing requests for the respective banks. When there are requests to the respective banks, the BANK-Cs 53 secure a right of use in the channels and execute readout, writing, and erasing requests for the banks managed by the BANK-Cs 53. An arbitration control circuit 54 monitors the NAND I/Fs 52 and the BANK-Cs 53 and arbitrates channel use rights of the banks according to a predetermined rule.

Figure 4:
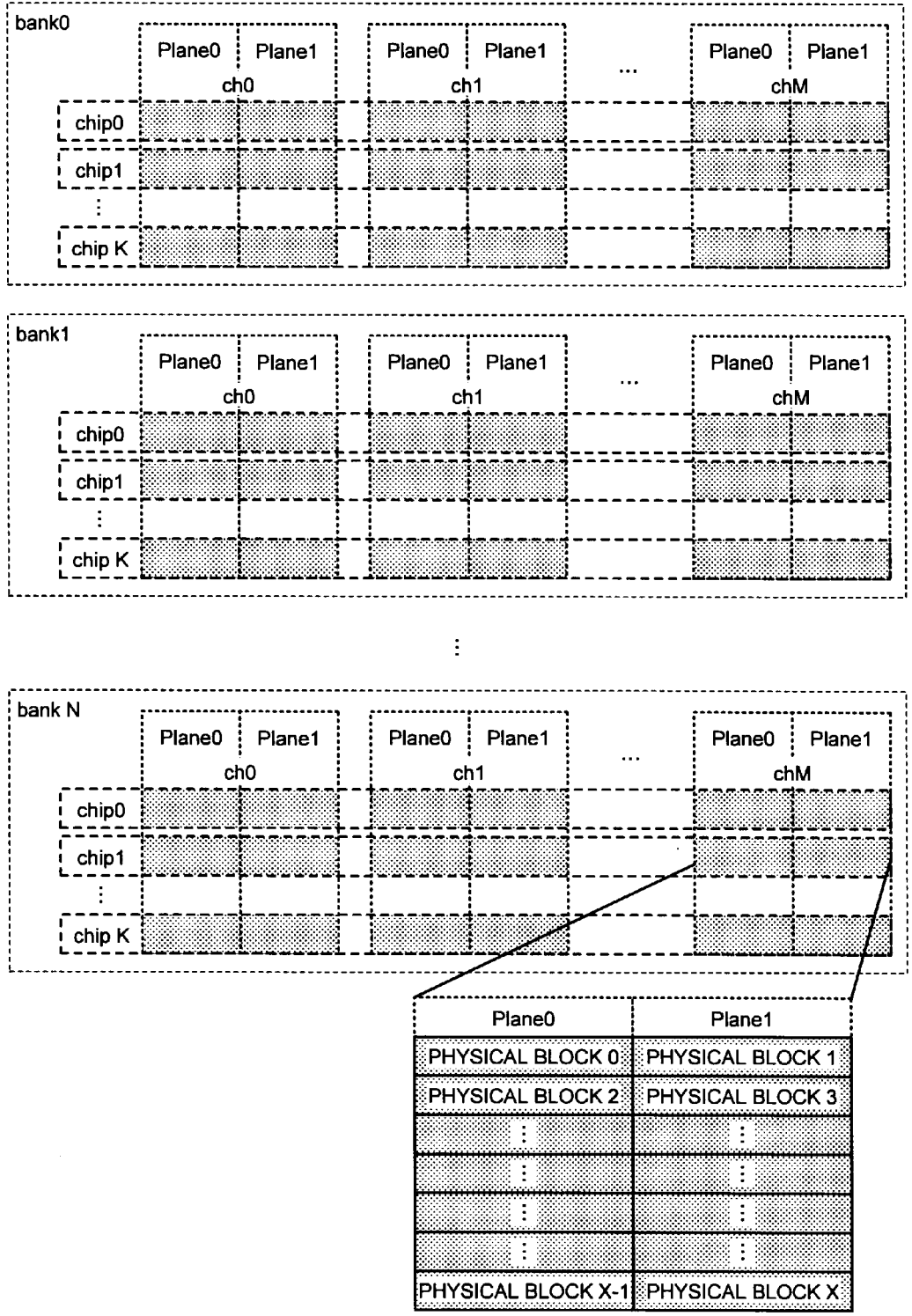
FIG. 4 is a diagram of a physical configuration of the NAND memory.

FIG. 4 is a diagram of a more detailed internal configuration of the NAND memory 10. In FIG. 4, the number of channels is shown as M+1, the number of banks is shown as N+1, and the number of chips is shown as K+1. As shown in FIG. 4, each of the memory chips (chip0 to chipK) is divided into two districts of a plane 0 and a plane 1, each including a plurality of physical blocks. The plane 0 and the plane 1 include peripheral circuits (e.g., a row decoder, a column decoder, a page buffer and a data cache) independent from one another. Erasing, writing, and readout can be simultaneously performed by using a double speed mode. Although the physical blocks in the same plane cannot be accessed in parallel, the physical blocks belonging to the different planes can be accessed in parallel. The number of planes in the memory chip is not limited to two and can be arbitrary. As shown in FIG. 4 in enlargement, one memory chip includes a plurality of physical blocks (in FIG. 4, X+1 physical blocks).

In this way, in the NAND memory 10, parallel operation by a plurality of channels, parallel operation by a plurality of banks, and parallel operation by the double speed mode using a plurality of planes are possible. When the number of channels is set to four, the number of banks is set to four, and the number of planes is set to two, it is possible to cause maximum thirty-two physical blocks to operate in parallel.

Figure 5:
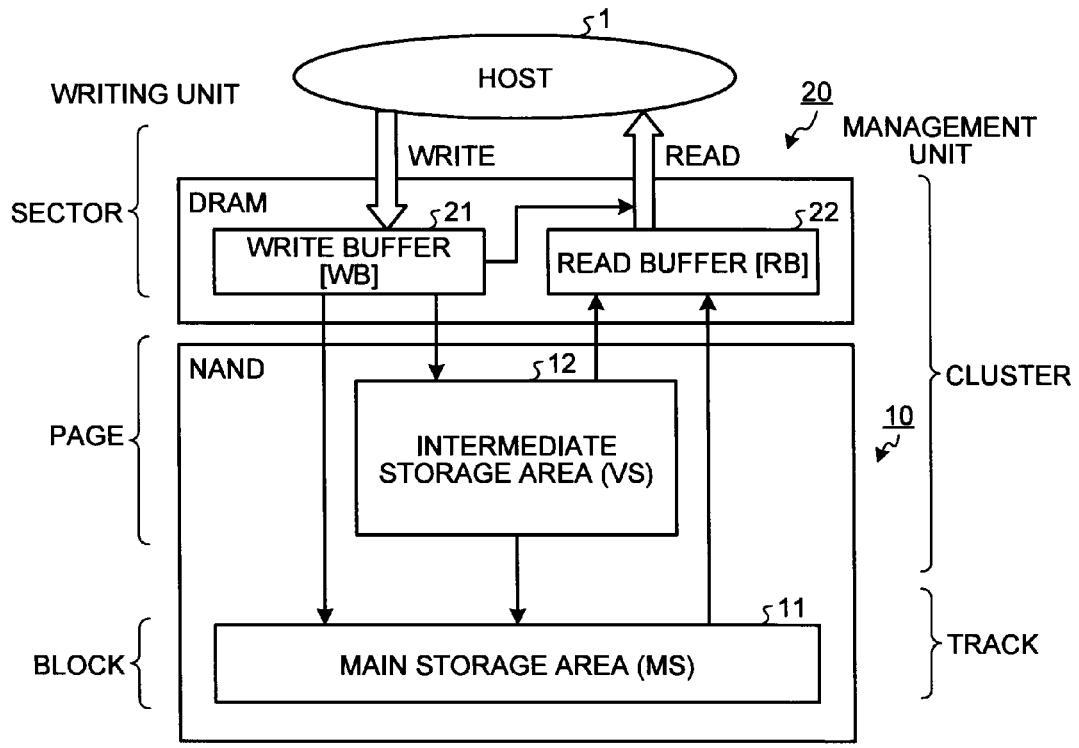
FIG. 5 is a block diagram of a functional configuration formed in the NAND memory and a random access memory (RAM)

FIG. 5 is a diagram of functional blocks formed in the NAND memory 10 and the RAM 20. A write buffer (WB) 21 and a read buffer (RB) 22 formed on the RAM 20 are interposed between the host 1 and the NAND memory 10. The WB 21 temporarily stores write data from the host 1. The RB 22 temporarily stores read data from the NAND memory 10. To reduce an amount of erasing for the NAND memory 10 during writing, the blocks in the NAND memory 10 are allocated to management areas, i.e., an intermediate storage area (VS) 12 and a main storage area (MS) 11. The VS 12 is an area for managing data from the WB 21 in a cluster unit, which is a "small unit". The MS 11 is an area for managing data from the WB 21 and the VS 12 in a track unit, which is a "large unit".

Figure 6:
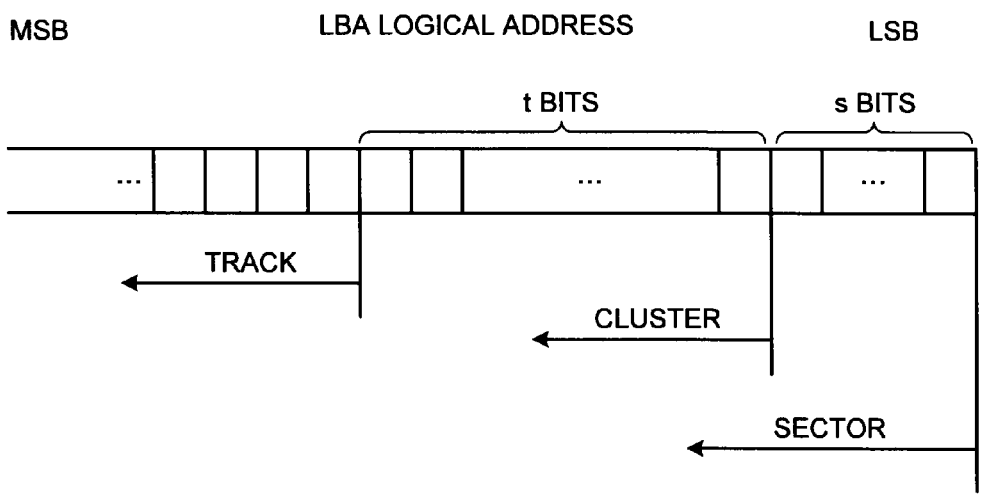
FIG. 6 is a diagram of an LBA logical address.

A specific functional configuration of the components shown in FIG. 5 is explained. When the host 1 reads data from or write data in the SSD 100, the host 1 inputs logical block addressing (LBA) as a logical address via the ATA interface 2. As shown in FIG. 6, the LBA is a logical address in which serial numbers are given to sectors (size: 512 bits) starting from 0. In this embodiment, as management units for the WB 21, the RB 22, the VS 12, and the MS 11 as the components shown in FIG. 5, a cluster address including a bit string of a lower-order (s+1) bit and higher-order bits of the LBA and a track address including a bit string of a lower order (s+t+1) bit and higher-order bits of the LBA are defined.

The sizes of a track and a logical block can be the same or the size of the track can be smaller than the size of the logical block. The logical block means an imaginary block formed by combining a plurality of physical blocks on the chip of the NAND memory 10. In this embodiment, the logical block means a unit obtained by collecting physical blocks by a maximum number of parallel channels (in this case, as shown in FIG. 1, maximum 4 ch). To effectively use the bank interleave, the physical blocks included in the logical blocks are selected from the physical blocks belonging to the same bank. A cluster size is equal to or larger than a sector size. For example, the cluster size is set smaller than a logical page size. Like the logical block, a logical page means a unit obtained by collecting physical pages by a maximum number of parallel channels. The track size is twice or larger natural number times as large as the cluster size.

In the NAND memory 10, as explained above, the parallel operation by a plurality of banks and the parallel operation by the double speed mode using a plurality of planes are possible. Therefore, in terms of logical block unit, in the NAND memory 10, it is possible to cause a plurality of logical blocks to operate in parallel by performing the parallel operation by the banks and the parallel operation using the planes.

Read Buffer (RB) 22

The RB 22 is an area for temporarily storing read data from the NAND memory 10 (the VS 12 and the MS 11) in response to a read request from the host 1. A cache memory function can be given to the RB 22. Data transfer to the host 1 is basically performed from the RB 22. When there is latest data in the WB 21, data transfer is performed from the WB 21 to the host 1.

Write Buffer (WB) 21

The WB 21 is an area for temporarily storing write data from the host 1 in response to a write request from the host 1. A cache memory function can be given to the WB 21. Data on the WB 21 is managed in a cluster unit and management of write and valid data is performed in a sector unit. When a resources of the WB 21 is insufficient, stored data of the WB 21 is flushed to the NAND memory 10. In the flushing, a track including a large number of valid clusters on the WB 21 (a high-density track) is flushed to the MS 11. A track including a small number of valid clusters on the WB 21 (a low-density track) is flushed to the VS 12. High-density data is data in which a ratio of valid data in a predetermined logical address range is larger than a predetermined ratio. Low-density data is data in which a ratio of valid data in the predetermined logical address range is smaller than the predetermined ratio.

Main Storage Area (MS) 11

In the MS 11, management of data is performed in a track unit. Most of user data is stored in the MS 11. A track including a large number of valid clusters on the WB 21 (high-density track: a track in which the number of valid clusters is equal to or larger than a predetermined threshold a) is directly written from the WB 21 in the MS 11. Besides, data that cannot be entirely managed in the VS 12 is input to the MS 11. A track in an LBA same as that of a track input to the MS 11 is invalidated in a logical block of the MS 11 and the logical block is released. A cluster belonging to the track in the LBA same as that of the track input to the MS 11 is invalidated in the VS 12. A logical block in which all clusters are invalidated is released.

Intermediate Storage Area (VS) 12

The VS 12 is a buffer having, for example, an FIFO structure in which data is managed in a cluster unit. Input to the VS 12 is performed in a logical page unit obtained by collecting a plurality of clusters. A track including a small number of valid clusters on the WB 21 (low-density track: a track in which the number of valid clusters is smaller than the predetermined threshold a) is written in the VS 12. The VS 12 has, for example, the FIFO structure in which logical blocks are arranged in writing order of data. When a cluster in an LBA same as that of a cluster present in the VS 12 is input to the VS 12, the cluster in the VS 12 only has to be invalidated and a rewriting operation is not involved. A cluster in an LBA same as that of the cluster input to the VS 12 is invalidated in a logical block. The logical block in which all clusters are invalidated is released. When a capacity of the VS 12 is saturated, clusters in the VS 12 are integrated into a track and urged to the MS 11.

In this way, the storage area of the NAND memory 10 is divided into the MS 11 and the VS 12 and managed. Therefore, data by sequential write, which is writing in which LBA addresses are basically consecutive, is mainly written in the MS 11 as high-density data. Data by random write, which is random writing in which LBA addresses are not consecutive, is mainly written in the VS 12 as low-density data.

In the first embodiment, the logical blocks are distinguished as free blocks FB and active blocks AB and managed. The free blocks FB are logical blocks that do not include valid data and to which applications are not allocated. The active blocks AB are logical blocks that include valid data and to which applications are allocated (e.g., allocated to the VS 12 and MS 11). A relation between logical addresses as LBAs used between the logical blocks and the host 1 and physical addresses indicating actual storage locations on the NAND memory 10 is managed in a block unit. The SSD 100 adopts a logical to physical translation system in which a relation between logical addresses and physical addresses is not statically determined in advance and the logical addresses and the physical addresses are dynamically associated during writing of data.

For example, when data on the same LBA address is overwritten, block exchange explained below is performed. It is assumed that valid data is stored in a logical address A1 and a block B1 is used as a storage area. When the SSD 100 receives a command for overwriting data (size of which is the same as the block) in the logical address A1 from the host 1, the SSD 100 secures one free block FB (a block B2) and writes the data received from the host 1 in the free block FB. Thereafter, the SSD 100 associates the logical address A1 and the block B2. As a result, the block B2 changes to the active block AB and, because the data stored in the block B1 is invalid, the block B1 changes to the free block FB. In this way, in the SSD 100, even data is in the same logical address A1, a block used as an actual storage area changes every time the data is written.

The free blocks FB are managed according to an FB management list. The FB management list is, for example, a list of an FIFO form in which the free blocks FB are sorted in order of times when the logical blocks changes to the free blocks FB or order of the number of times of erasing of the blocks. Block identifiers are stored in entries of the list. The logical block changing from the active block AB to the free block FB is added to the FB management list. When the free block FB is used, the free block FB is extracted from the FB management list. In the FB management list, wear leveling processing for generally equalizing the numbers of times of erasing and erasing interval of all the logical blocks is executed.

A main part of this embodiment is explained below. In this embodiment, management for allocation of the free blocks FB in the VS 12 and the MS 11 are separated. The free blocks FB are preferentially allocated to the MS 11.

First, a comparative example is explained. Because writing speed is low in the NAND memory 10, as explained above, the SSD 100 enables parallel operation by channels, planes, and banks to improve transfer performance. A simplest method for securing the number of writing parallelism of logical blocks during the sequential write is to adopt an LBA fixed allocation system for fixing order of banks and planes that can be written in parallel with the order of LBAs and make it possible to always write the banks and the planes at a maximum number of parallelisms. However, in this system, when writing in a specific LBA is repeated, the number of times of erasing of a specific plane increases and it is likely that product life is reduced.

Figure 7:
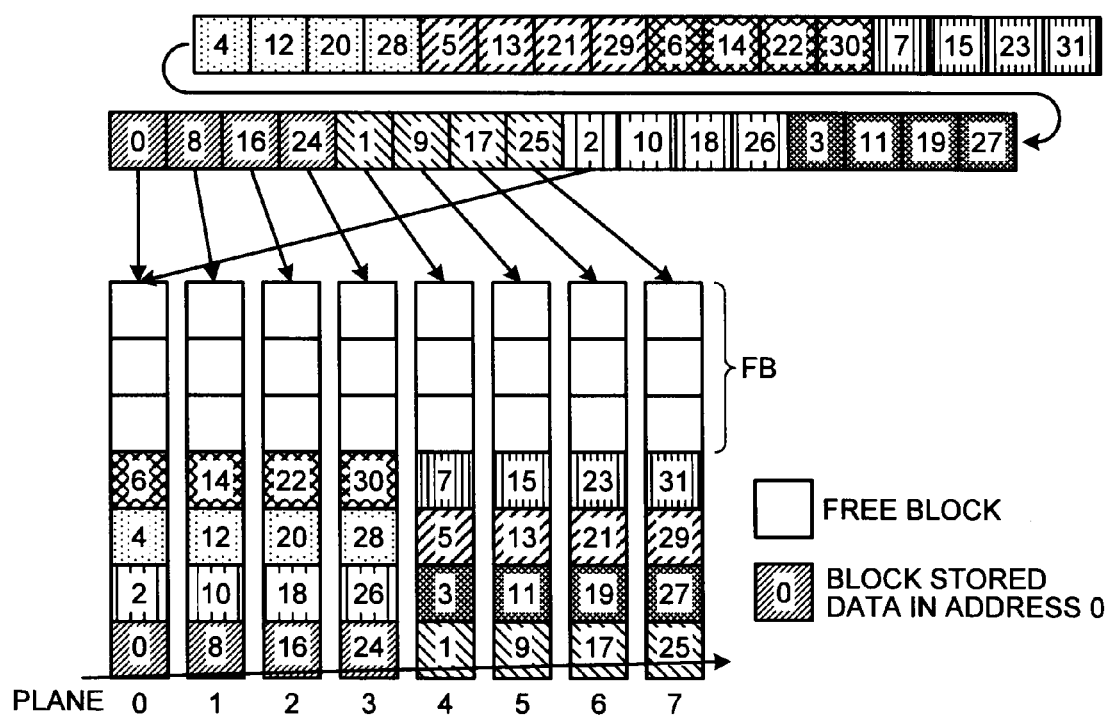
FIG. 7 is a conceptual diagram of a dynamic block allocation system according to a comparative example.

Therefore, it is conceivable to adopt an LBA dynamic block allocation system that dynamically changes allocation of LBAs, banks, chips, and planes. In this system, as shown in FIG. 7, sets of planes writable in parallel (a plurality of FB management lists writable in parallel formed in a plane unit) are created and, every time a writing request is received, blocks that can be written in parallel are allocated to new data in a round-robin manner. Blank squares indicate the free blocks FB. A square inserted with 0 indicates a block in which data in LBA address "0" is stored. In FIG. 7, a state in which four threads perform the sequential write in a host is shown. It is assumed that LBA addresses of a first thread are "0. 1, 2, 3, . . . ", LBA addresses of a second thread are "8, 9, 10, 11, . . . ", LBA addresses of a third thread are "16, 17, 18, 19, . . . ", and LBA addresses of a fourth thread are "24, 25, 26, 27, . . . ". It is assumed that data is input to the SSD 100 from the host 1 in order shown in the figure. In FIG. 7, planes are selected by round robin in input order of data and LBA addresses are dispersed to the respective planes.

In this way, when the round-robin system is used, in normal use, the LBA addresses are dispersed probabilistically to the respective planes. However, in some case, the number of used blocks in each of the planes is biased depending on a writing pattern. When the number of used blocks is biased and a block cannot be secured from a specific plane, the number of parallelisms of writing is biased and transfer performance is deteriorated.

FIGS. 8A and 8B indicate that, even when the LBA dynamic block allocation system is adopted, the number of used blocks for each of the planes is biased depending on a specific LBA pattern. First, it is assumed that the sequential write for all the planes (total sequential write) is performed. When a simple round robin is used, as shown in FIG. 8A, mapping same as that in an LBA fixed allocation system is obtained. Subsequently, it is assumed that writing for updating only blocks present in a specific plane (in this case, a plane 0) occurs. Specifically, it is assumed that data of logical addresses "0, 8, 16, 24, . . . " of multiples of 8 is stored in the blocks of the plane 0 and update writing for the logical addresses "0, 8, 16, 24, . . . " of the multiples of 8 occurs. In the LBA dynamic block allocation system, as explained above, even if data is data of the same logical address, a block used as an actual storage area changes every time writing is performed. Therefore, as shown in FIG. 8B, data of the update writing is dispersed and written in the blocks of the planes. According to the writing of the data, the blocks of the plane 0 in which the data is written in the total sequential write are released as the free blocks FB. As a result, the free blocks FB concentrate on only the plane 0. Release of blocks (a change of active blocks to free blocks) does not occur in the planes other than the plane 0. Therefore, free blocks are exhausted. In this way, even when the LBA dynamic block allocation system is used, it is likely that the number of used specific planes increase and writing parallelism is deteriorated depending on a writing pattern.

As explained above, data by the sequential write, which is writing in which LBA addresses are basically consecutive, is mainly written in the MS 11 as high-density data. Data by the random write, which is random writing in which LBA addresses are not consecutive, is mainly written in the VS 12 as low-density data. To improve sequential write performance, the MS 11 for which the sequential write is performed is requested to increase the number of writing parallelism. Therefore, it is also conceivable to adopt the LBA fixed allocation system. However, in this system, as explained above, if writing in a specific LBA is repeated, the number of times of erasing of a specific plane increases and it is likely that product life is reduced.

Consequently, in this embodiment, the dynamic block allocation system is adopted in both the VS 12 and the MS 11, the allocation management for the free blocks FB in the VS 12 and the MS 11 is separated, and the free blocks FB are preferentially allocated to the MS 11 to prevent deterioration in block parallelism during the sequential write.

Figure 9:
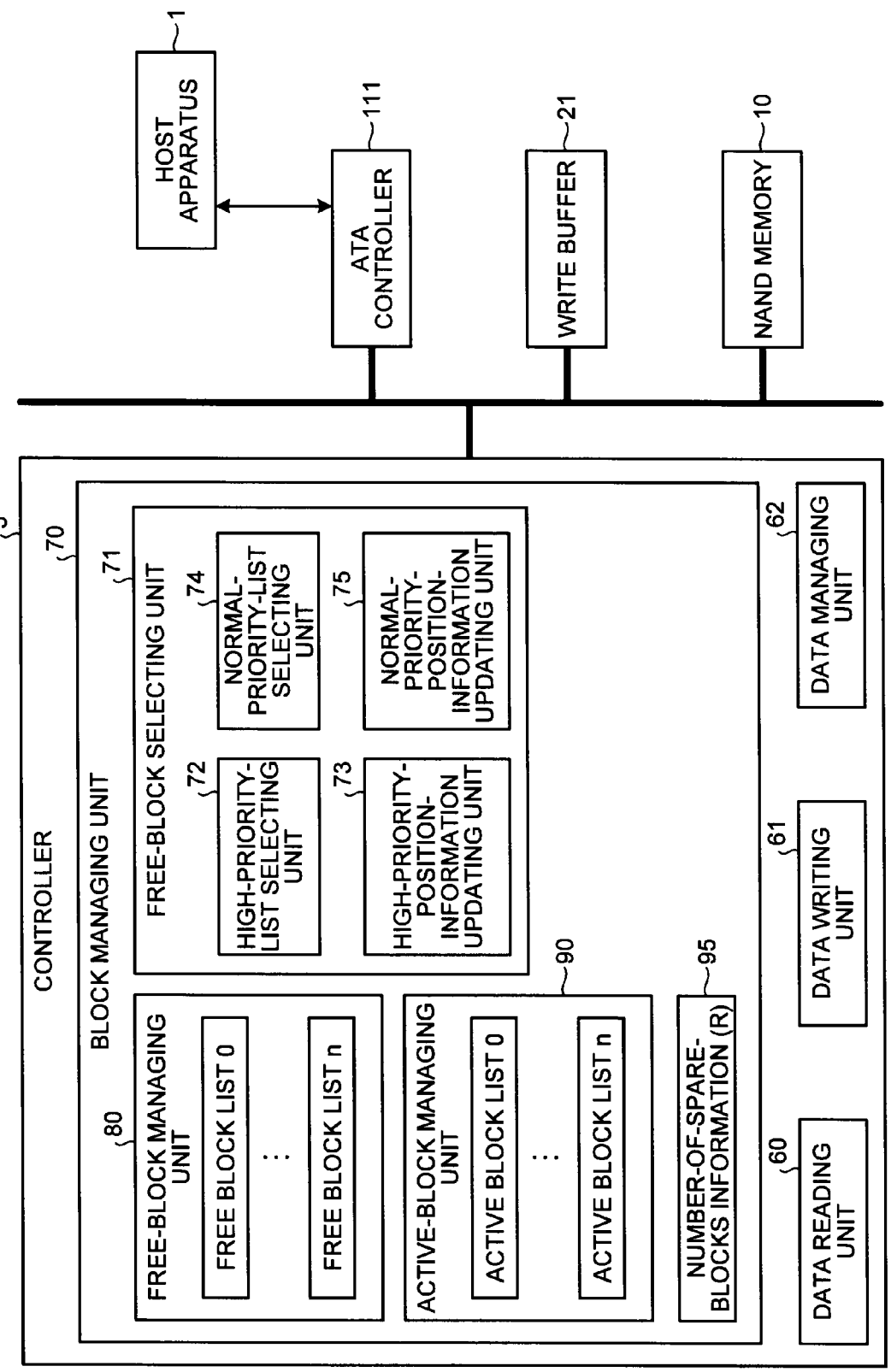
FIG. 9 is a functional block diagram of a main part configuration in a first embodiment.

FIG. 9 is a functional block diagram of a main part configuration in the first embodiment. A controller 5 includes a data reading unit 60, a data writing unit 61, and a data managing unit 62. These functional elements are realized by the firmware explained above. The controller 5 can also include a system-on-a-chip (SoC) in which functions that should be realized by the controller 5 are incorporated as circuits. The ATA controller 111, the write buffer 21, and the NAND memory 10 explained above are connected to the controller 5 via a bus.

The data managing unit 62 manages a logical to physical relation between logical addresses as LBAs used between the controller 5 and the host 1 and physical addresses indicating actual storage locations on the NAND memory 10. The logical to physical translation system explained above in which a relation between logical addresses and physical addresses is not statically determined in advance and the logical addresses and the physical addresses are dynamically associated during writing of data is adopted.

When the data reading unit 60 is notified of read command reception from the ATA controller 111, the data reading unit 60 causes the data managing unit 62 to search for a block corresponding to an address designated in the command and reads out data from the found block to the read buffer (RB) 22 (see FIG. 5). Thereafter, the data reading unit 60 controls the ATA controller 111 to transmit data in a range designated by the command to the host 1.

When the data writing unit 61 is notified of write command reception from the ATA controller 111, the data writing unit 61 secures a free area of the write buffer (WB) 21 and controls the ATA controller 111 to receive data from the host 1. Thereafter, when sufficient write data is accumulated in the write buffer (WB) 21 and data flush is necessary, the data writing unit 61 outputs a request for securing the free blocks FB in a number necessary for data writing to a block managing unit 70 and writes data in a block secured by the block managing unit 70. Thereafter, the data writing unit 61 requests the data managing unit 62 to register a correspondence relation between addresses and blocks.

The block managing unit 70 includes a free-block selecting unit 71, a free-block managing unit 80, and an active-block managing unit 90. The block managing unit 70 performs management of the blocks, selection of the free block FB used during data writing, and selection of the active block AB.

The free-block managing unit 80 manages the free blocks FB. The free-block managing unit 80 has a plurality of free block lists (FB lists) for managing the free blocks FB for each of the planes. The FB lists are stored in the RAM 20 and used as the management information explained above. The free blocks FB are managed according to free block lists corresponding to planes to which the free blocks belong. As a detailed form of the FB lists, there is a list form in which block information including block identifiers corresponding to the free blocks FB is linked as nodes. Order of linking the blocks to the free block lists can also be a simple FIFO or can also be order obtained by sorting the blocks with the numbers of times of erasing of the blocks.

The active-block managing unit 90 manages the active blocks AB. The active-block managing unit 90 has a plurality of active block list (AB list) for managing the active blocks AB for each of the planes. The AB lists are stored in the RAM 20 and used as the management information explained above. The active blocks are managed according to the active block lists corresponding to planes to which the active blocks belong. As a detailed form of the AB lists, there is a list form in which block information including block identifiers corresponding to the active blocks AB is linked as nodes. Order of linking the blocks to the AB lists can also be a simple FIFO and the blocks are sorted in order of securing. If the order of securing can be determined, the AB list can also be, for example, a structure of a bidirectional list and is not limited to the structure of the FIFO.

To secure the number of free blocks β requested from the data writing unit 61, the free-block selecting unit 71 selects the free blocks FB by the requested number β from the FB list managed by the free-block managing unit 80. When the free-block selecting unit 71 selects sets of the free blocks FB writable in parallel, the free-block selecting unit 71 selects the FB list according to a predetermined order rule and acquires the free blocks FB from the selected FB list.

In this embodiment, the logical block is constituted by, for example, collecting physical blocks having the same bank number, chip number, and plane number from the respective channels. That is, in the present embodiment, restrictions of from (1) to (4) below are set regarding how to combine the physical blocks constituting the logical block.

(1) To select one physical block of each channel.
(2) To select a physical block of each channel from physical blocks belonging to the same chip number.
(3) To select a physical block of each channel from physical blocks belonging to the same plane number.
(4) To select a physical block in the same bank.

Figure 10:
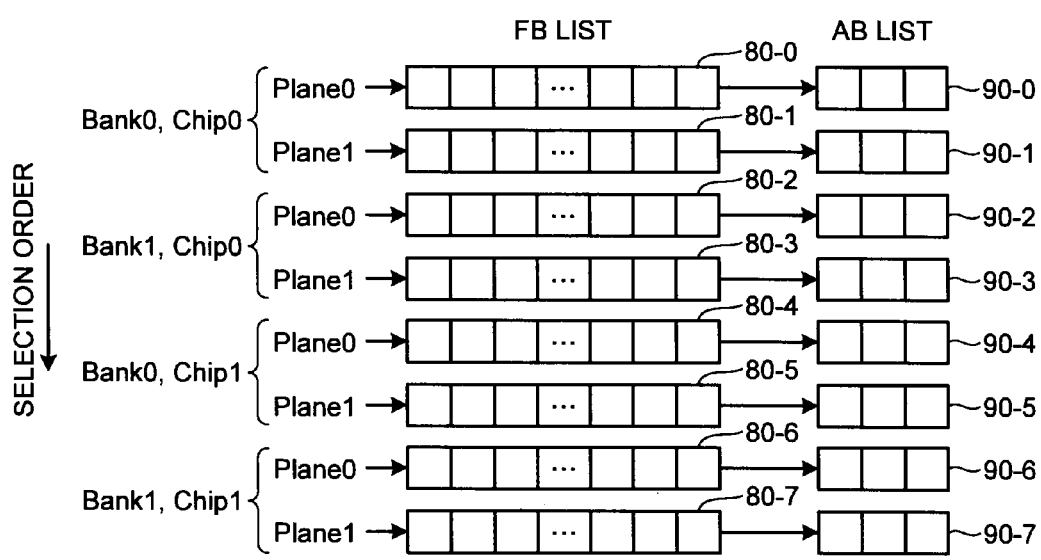
FIG. 10 is a diagram of a free block list and an active block list.

Therefore, the logical blocks can be classified for each of the banks, each of the chips, and each of the planes. As shown in FIG. 10, each of FB lists 80-0 to 80-7 are configured as a list of logical blocks having the same bank number/chip number/plane number.

The order rule is desirably order that makes it possible to acquire free blocks FB of a set writable in parallel if FB lists are selected in that order.

For example, when the number of banks is four, the number of chips in each of the banks is one, and the number of planes in each of the chips is two (the number of chips is four in total), eight planes in total are present. Parallel writing is possible among all the planes. In this case, if one free block is selected from each of the planes, writing of maximum eight free blocks can be performed in parallel. In this case, identifiers 0 to 7 are attached to the free block lists corresponding to the planes to form an order rule having length 8 {0 1, 2, 3, 4, 5, 6, 7}. If this order rule is repeated, irrespective of from which position the selection of free blocks is started, maximum eight free blocks writable in parallel can be selected. For example, even when the selection is started from a position 4, a free block list only has to be selected in such a manner as {4, 5, 6, 7, 0, 1, 2, 3}.

When there is limitation on sets of planes writable in parallel, the planes that cannot be written in parallel only have to be arranged apart from one another as much as possible in the order rule. For example, it is assumed that, although the number of chips is four in total as explained above, the number of banks is two, the number of chips in each of the banks is two, and the number of planes in each of the chips is two, i.e., there is limitation that sets of two chips form two banks and the chips belonging to the same bank cannot be written in parallel. In this case, although there are eight planes in total, maximum parallelism is four. At this point, if each of the planes is represented as "B (bank number) C (chip number in plane) P (plane number in chip)", as shown in FIG. 10, an order rule {B0C0P0, B0C0P1, B1C0P0, B1C0P1, B0C1P0, B0C1P1, B1C1P0, B1C1P1} only has to be formed.

In FIG. 10, the chips belonging to the same bank cannot be written in parallel. Therefore, four free blocks FB belonging to the FB lists 80-0 to 80-3 can operate in parallel. Four free blocks FB belonging to the FB lists 80-4 to 80-7 can also operate in parallel. Four free blocks FB belonging to the FB lists 80-2 to 80-5 can also operate in parallel. Four free blocks belonging to the FB lists 80-6 to 80-1 can also operate in parallel. However, the free blocks FB belonging to the FB lists 80-0 and 80-1 and the free blocks FB belonging to the FB lists 80-4 and 80-5 cannot operate in parallel. The free blocks FB belonging to the FB lists 80-2 and 80-3 and the free blocks FB belonging to the FB lists 80-6 and 80-7 cannot operate in parallel. These free blocks FB are arranged apart from one another in the order rule.

In FIG. 10, active block lists 90-0 to 90-7 are also shown. Block identifiers of free blocks acquired from the FB lists 80-1 to 80-7 of the planes are linked to the AB lists 90-1 to 90-7 of the same planes and registered as the active blocks AB.

The free-block selecting unit 71 stores information indicating the order of selection on the order rule. This information is called position information P because the information indicates a position on an order row of the FB list created according to the order rule. The free-block selecting unit 71 includes a list selecting unit that selects the FB list according to the order rule and the position information P and a position-information updating unit that updates the position information P after the free block selection. As the list selecting unit and the position-information updating unit, two sets of a high-priority processing unit and a normal-priority processing unit are provided according to priority.

In this embodiment, to secure transfer ability during writing, write data received from the host is temporarily accumulated in the write buffer 21 and, after a sufficient amount of data is accumulated, the data is written in the free blocks of the NAND memory 10 in parallel. In the writing in the NAND memory 10, a system for changing a writing destination (the MS 11 or the VS 12) according to granularity (high density or low density) of data as a flush target from the write buffer 21. Such a system is explained in detail in Japanese Patent Application Laid-Open No. 2009-535161. For example, in the sequential write, the data is continuous large data (having high density). The data is collected in a block unit and written in the MS 11 in parallel while securing as large parallelism as possible.

Number-of-spare-blocks information 95 stores the number of free blocks secured as spare blocks in each of the FB lists. The number of free blocks secured in the FB list is represented as R. The spare blocks can be used only in a highpriority-list selecting unit 72. A normal-priority-list selecting unit 74 cannot use the spare blocks.

The high-priority-list selecting unit 72 operates when high priority is designated by the data writing unit 61. The high-priority-list selecting unit 72 selects the FB list to secure the number of free blocks $\beta$ requested by the data writing unit 61. In selecting the free block FB from the FB list, the high-priority-list selecting unit 72 can use the spare blocks secured in each of the FB list. A high-priority-position-information updating unit 73 performs update of the position information P of the order rule when the high-priority-list selecting unit 72 is operating.

The normal-priority-list selecting unit 74 operates when designation of normal priority is received from the data writing unit 61. The normal-priority-list selecting unit 74 selects the FB list to secure the number of free blocks $\beta$ requested by the data writing unit 61. In selecting the free block FB from the FB list, the normal-priority-list selecting unit 74 cannot use the spare blocks secured in each of the FB lists. The normal-priority-position-information updating unit 75 performs update of the position information P of the order rule when the normal-priority-list selecting unit 74 is operating. The high-priority-position-information updating unit 73 and the normal-priority-position-information updating unit 75 are provided to independently perform update of the position information P in the case of high priority and normal priority. However, the update of the position information P may be performed in parallel in the case of high priority and normal priority.

A overall procedure of the writing processing is schematically explained below according to FIG. 11. When the ATA controller 111 receives a command from the host 1 (step S100), the ATA controller 111 determines whether the received command is a write command (step S110). When the received command is a command other than the write command, the ATA controller 111 executes processing corresponding to the received command (step S120).

When the received command is the write command, the ATA controller 111 executes processing explained below. First, the ATA controller 111 notifies the controller 5 of the reception of the write command (step S130). According to the notification, the data writing unit 61 of the controller 5 secures an area for receiving write data in the write buffer 21 and instructs the ATA controller 111 to receive data in the secured area (step S140). Subsequently, the ATA controller 111 receives write data from the host 1 and stores the received data in a designated area on the write buffer 21 (step S150). The data writing unit 61 compares accumulated data in the write buffer 21 with a predetermined flush threshold to determine whether sufficient data is accumulated in the write buffer 21 (step S160). When sufficient data is not accumulated on the write buffer 21, the ATA controller 111 shifts the procedure to step S100 and returns to a command-waiting state.

When data equal to or larger than the flush threshold is accumulated in the write buffer 21, the data writing unit 61 calculates the number of free blocks $\beta$ (a requested number $\beta$) necessary for data flushing from the write buffer 21 to the NAND memory 10 (step S170). The data writing unit 61 determines granularity (density) of data to be flushed. When the granularity of the data is high (the density is low), the data writing unit 61 designate normal priority. When the granularity of data is low (the density is high), the data writing unit 61 designates high priority and sends a request for the free blocks FB to the free block FB together with the number of free blocks $\beta$ (step S180).

The block managing unit 70 selects sets of free blocks writable in parallel equal to or smaller than the requested number $\beta$ and notifies the data writing unit 61 of the selected free blocks (step S190). The block managing unit 70 sets the free blocks FB selected from the FB list as the active blocks AB and links the free blocks FB to the AB list of the same plane corresponding to the free blocks FB (step S200). The processing at step S190 is explained in detail later.

The data writing unit 61 requests the RAM controller 114 and the NAND controller 113 (see FIG. 1) to write, in parallel, the data on the write buffer 21 in the free blocks notified by the block managing unit 70. The RAM controller 114 executes data readout from the write buffer 21. The NAND controller 113 writes the data read out from the write buffer 21 in the NAND memory 10 at secured parallelism (step S210).

The data writing unit 61 requests the data managing unit 62 to register a correspondence relation between logical addresses of the data written in the NAND memory 10 and physical addresses of the block. The data managing unit 62 registers a logical to physical relation between the logical addresses for which the data writing is performed and the blocks (step S220), excludes, from the AB list, the active blocks AB associated before with the logical addresses for which the data writing is performed, and notifies the block managing unit 70 to manage the active blocks AB as the free blocks FB (step S230). The block managing unit 70 specifies an FB list corresponding to a plane to which the free blocks notified by the data managing unit 62 belong and links the notified free blocks to the specified FB list.

The data writing unit 61 determines whether the number of free blocks writeable in parallel selected at step S190 reaches the requested number $\beta$ (step S240). In other words, the data writing unit 61 determines whether data required to be flushed from the write buffer 21 to the NAND memory 10 remains. When the number of free blocks writable in parallel does not reach the requested number $\beta$, the data writing unit 61 returns to step S170 and recalculates the requested number $\beta$. When the number of free blocks rewritable in parallel reaches the requested number $\beta$, the data writing unit 61 ends the processing for flushing data from the write buffer 21 to the NAND memory 10.

Figure 11:
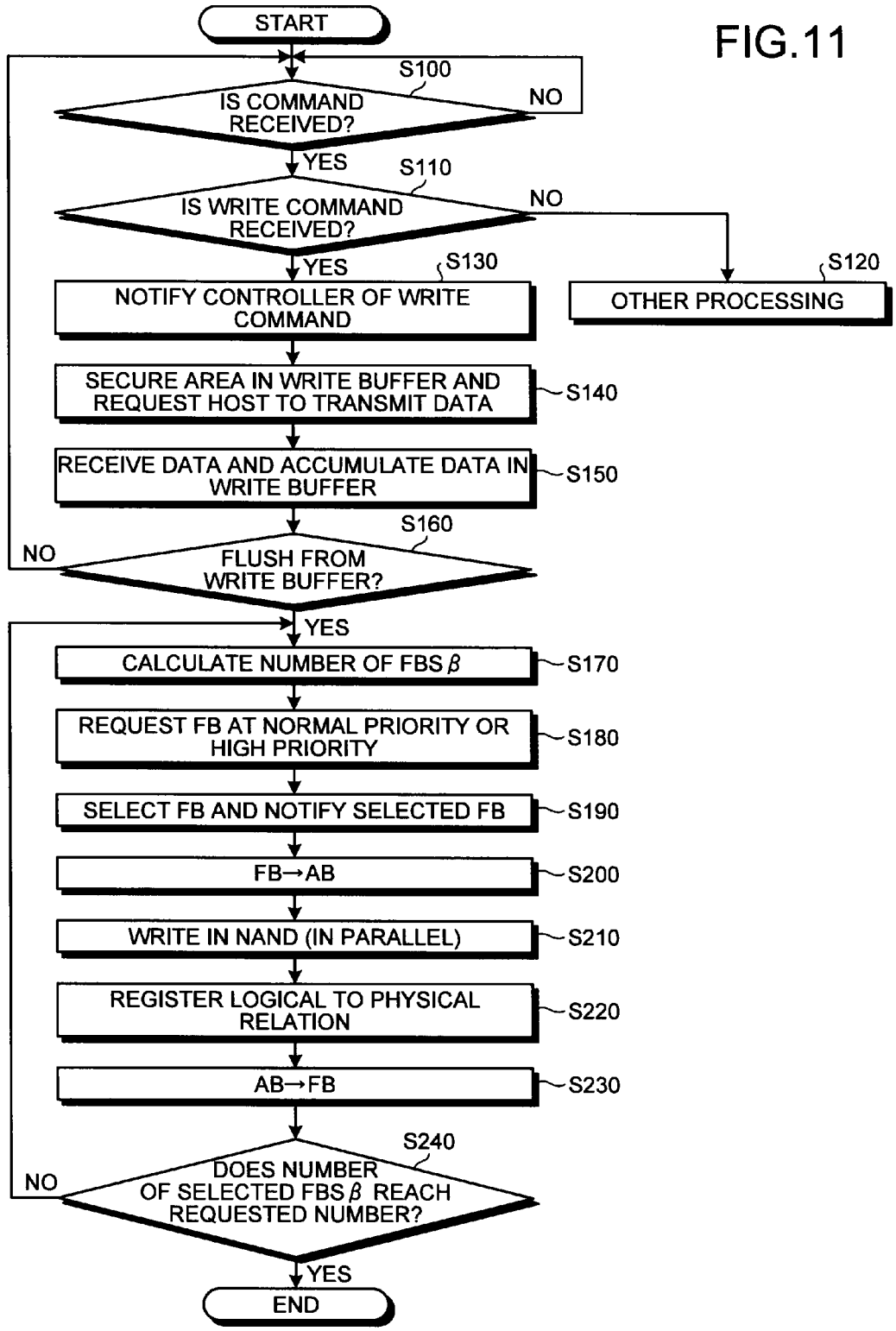
FIG. 11 is a flowchart for explaining an overall flow of a writing operation.
Figure 12:
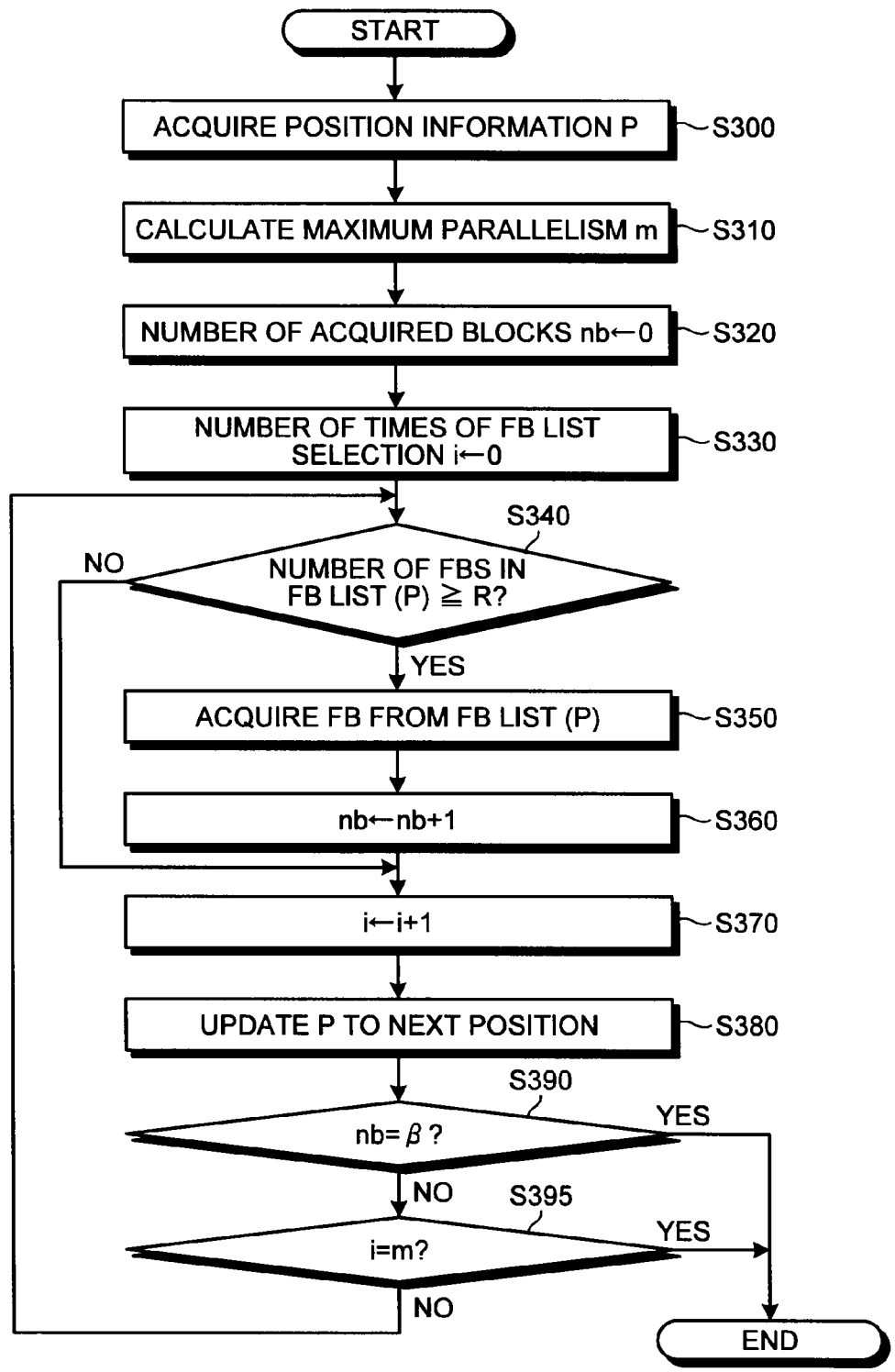
FIG. 12 is a flowchart of a free block selection procedure at normal priority.

An operation procedure of the block managing unit 70 performed when the normal priority is designated at step S180 in FIG. 11 is explained according to FIG. 12. The requested number of free blocks from the data writing unit 61 is represented as $\beta$ (the requested number $\beta$).

The normal-priority-list selecting unit 74 acquires the position information P from the normal-priority-position-information updating unit 75 (step S300). The position information P is the next position of an end position of the order rule in the last free block selection in the normal priority. The normal-priority-list selecting unit 74 calculates maximum parallelism m obtained when acquisition of the free blocks FB is started from the acquired position information P (step S310). For example, in the FB list structure shown in FIG. 10, as explained above, when the acquisition of the free blocks FB is started from the FB list 80-0, four FB lists from the FB list 80-0 to the FB list 80-3 can be selected and maximum parallelism is 4. However, when the acquisition of the free blocks FB is started from the FB list 80-1, only three FB lists from the FB list 80-1 to the FB list 80-3 can be selected and maximum parallelism is 3. Subsequently, the normal-priority-list selecting unit 74 sets the number of acquired blocks nb to 0 and sets the number of times of list selection i to 0 (steps S320 and S330).

The normal-priority-list selecting unit 74 determines whether the number of the free blocks FB remaining in the FB list (P) corresponding to the position information P is equal to or larger than R set as the number-of-spare-blocks information 95 (step S340). When the number of spare blocks is smaller than R in this determination, the normal-priority-list selecting unit 74 does not perform the acquisition of the free blocks FB from the FB list (P). The procedure shifts to step S370. When the number of the free blocks remain in the FB list (P) is equal to or larger than R in the determination at step S340, the normal-priority-list selecting unit 74 acquires the free blocks FB from the FB list (P). The normal-priority-list selecting unit 74 increments the number of acquired blocks nb by 1 and increments the number of times of list selection i by 1 (steps S360 and S370).

The normal-priority-list selecting unit 74 increments the position information P by 1 and updates the position information P to the next position (step S380). When the position information P is over a last position of the order rule, the normal-priority-list selecting unit 74 sets the position information P to the start of the order rule. The normal-priority-list selecting unit 74 determines whether the number of acquired blocks nb reaches the requested number β (step S390). When the number of acquired blocks nb is equal to the requested number β (nb=β), the normal-priority-list selecting unit 74 ends the processing. The normal-priority-list selecting unit 74 determines whether the number of times of list selection i reaches the calculated maximum parallelism m (step S395). When the number of times of list selection i is equal to the calculated maximum parallelism m (i=m), the normal-priority-list selecting unit 74 ends the processing. In this way, the normal-priority-list selecting unit 74 acquires the free blocks FB from the FB list (P) while updating the position information P until nb=β or i=m holds.

In this way, when the normal-priority-list selecting unit 74 selects the free blocks FB from the FB list, the normal-priority-list selecting unit 74 cannot use the spare blocks secured in the FB lists.

Figure 13:
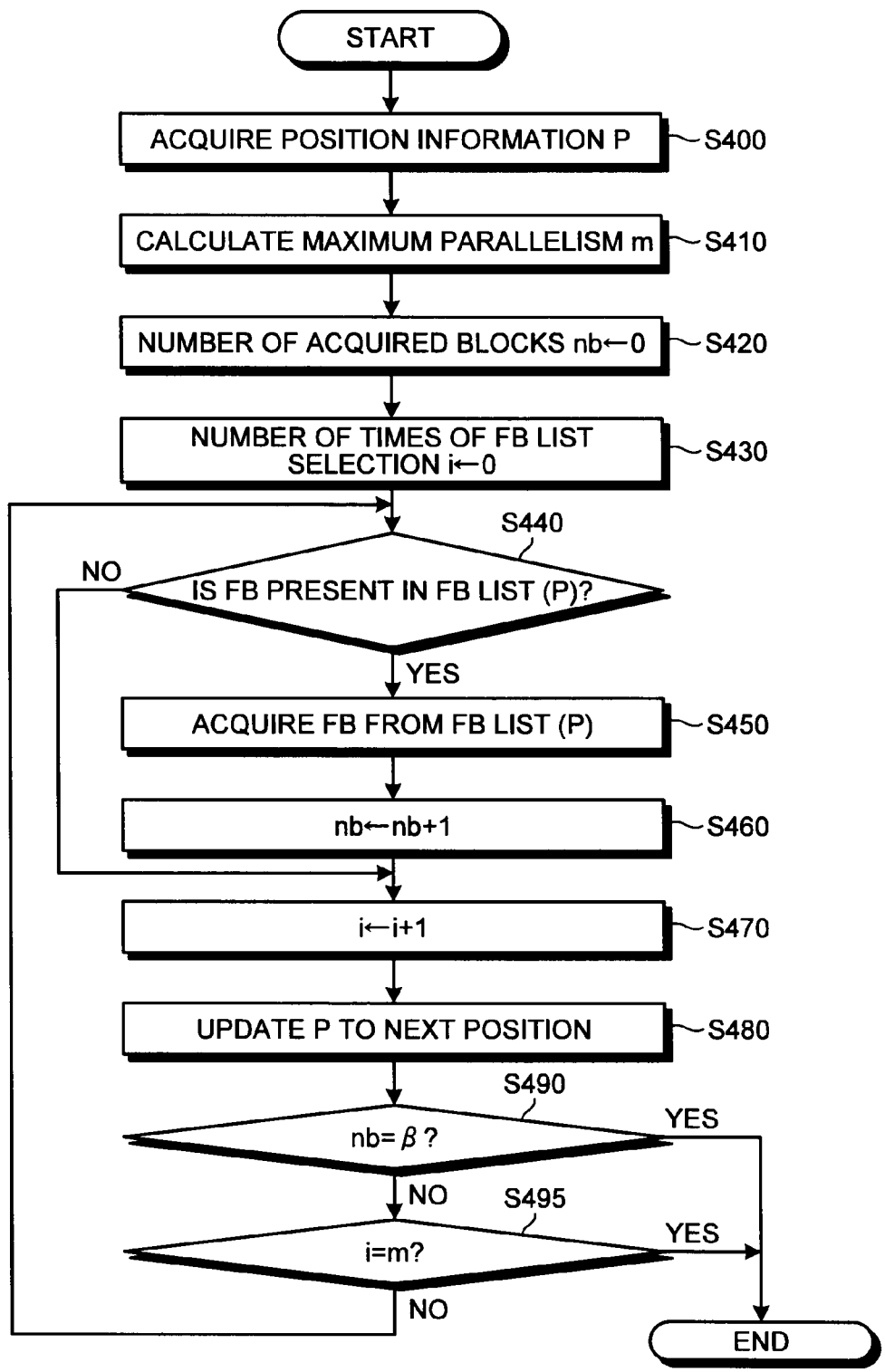
FIG. 13 is a flowchart of a free block selection procedure at high priority.

An operation procedure of the block managing unit 70 performed when the high priority is designated at step S180 in FIG. 11 is explained according to FIG. 13.

The high-priority-list selecting unit 72 acquires the position information P from the high-priority-position-information updating unit 73 (step S400). The position information P is the next position of the end position of the order rule in the last free block selection at the high priority. The high-priority-list-selecting unit 72 calculates the maximum parallelism m obtained when acquisition of the free blocks FB is started from the acquired position information P (step S410). Subsequently, the high-priority-list selecting unit 72 sets the number of acquired blocks nb to 0 and sets the number of times of list selection i to 0 (steps S420 and S430).

The high-priority-list selecting unit 72 determines whether there are the free blocks FB in the FB list (P) corresponding to the position information P (step S440). When there is no free block in this determination, the high-priority-list selecting unit 72 shifts the procedure to step S470 without performing the acquisition of the free blocks FB from the FB list (P). When there are the free blocks FB in the FB list (P) in the determination at step S440, the high-priority-list selecting unit 72 acquires the free blocks FB from the FB list (P) (step S450). The high-priority-list selecting unit 72 increments the number of acquired blocks nb by 1 and increments the number of times of list selection by 1 (steps S460 and S470).

The high-priority-list selecting unit 72 increments the position information P by 1 and updates the position information P to the next position (step S480). When the position information P is over the last position of the order rule, the high-priority-list selecting unit 72 sets the position information P to the start of the order rule. The high-priority-list selecting unit 72 determines whether the number of acquired blocks nb reaches the requested number β (step S490). When the number of acquired blocks nb is equal to the requested number β (nb=β), the high-priority-list selecting unit 72 ends the processing. The high-priority-list selecting unit 72 determines whether the number of times of list selection i reaches the calculated maximum parallelism m (step S495). When the number of times of list selection i is equal to the calculated maximum parallelism m (i=m), the high-priority-list selecting unit 72 ends the processing. In this way, the high-priority-list selecting unit 72 acquires the free blocks FB from the FB list (P) while updating the position information P until nb=β or i=m holds.

In this way, when the high-priority-list selecting unit 72 selects the free blocks FB from the FB list, the high-priority-list selecting unit 72 can use the spare blocks secured in the FB lists.

In calculating maximum parallelism at steps S310 and S410, when the requested number β is larger than the maximum parallelism m (β>m), the normal-priority-list selecting unit 74 and the high-priority-list selecting unit 72 can change the position information P, for example, sets the position information P to, for example, a position corresponding to the FB list of the plane at the start of the order rule, and performs control to secure the maximum parallelism as much as possible.

In the above explanation, when the FB list is selected, the simple round-robin system is adopted. However, for example, the FB list in which the free blocks FB are acquired can also be selected by a round-robin system weighted by a value inversely corresponding to the number of bad blocks BB (BB number) that occur in the banks, the chips, and the planes, the number of logical blocks usable in the banks, the chips, and the planes (a sum of the number of the free blocks FB and the number of the active blocks AB, the number of blocks belonging to the FB lists, or the like. The back blocks BB are physical blocks that cannot be used as a storage area because, for example, there a large number of errors. For example, physical blocks for which an erasing operation is not normally completed are registered as the bad blocks BB. A method of selecting, according to the weighted round-robin system, the FB list in which the free block FB are acquired is explained in detail in Japanese Patent Application Laid-Open No. 2009-30299.

As explained above, in the first embodiment, the free block list management by the LBA dynamic block allocation system is adopted, the predetermined number R of spare blocks are left in each of the free block lists. The spare blocks are used when high-density data is written in the NAND memory 10. The spare blocks are not used when low-density data is written in the NAND memory 10. Therefore, even if special writing for updating only blocks present in a specific plane occurs, it is possible to perform high-speed access without deteriorating writing parallelism in the sequential write in which writing of a high-density track is performed.

The set value R of the number of spare blocks can also be varied according to, for example, the number of the back blocks BB in each of the free block lists.

A second embodiment of the present invention is explained below. Even if the method in the first embodiment is used, the number of free blocks is not being bias among the FB lists. Therefore, in the second embodiment, when the number of used blocks is biased among the planes (the FB lists), making use of time when there is no access from the host 1, data is moved from a plane in which the number of used blocks is large to a plane in which the number of used blocks is small to reduce the number of used blocks to be equal to or smaller than a fixed number in the planes.

Figure 14:
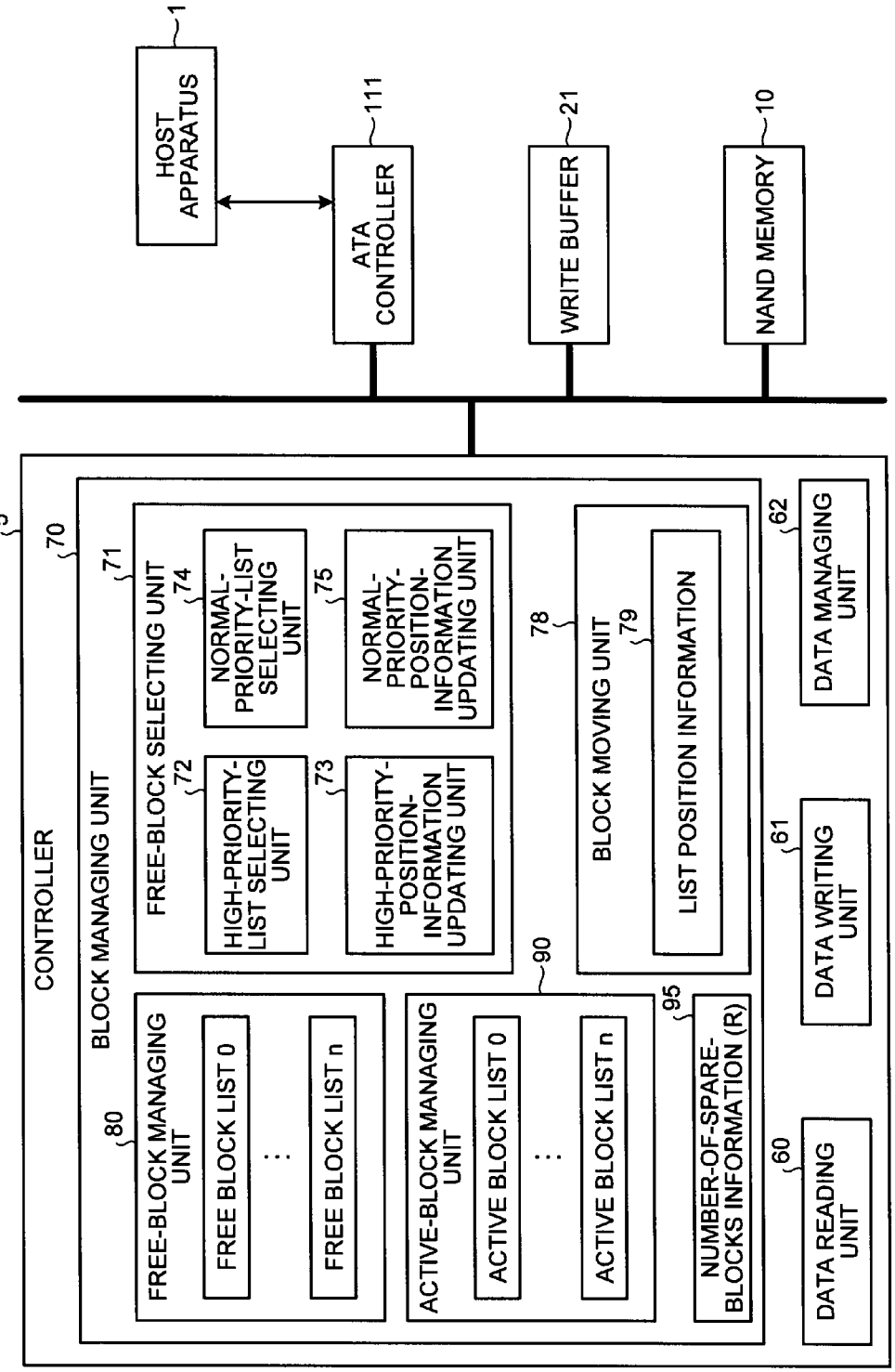
FIG. 14 is a functional block diagram of a main part configuration in the first embodiment.

FIG. 14 is a functional block diagram of a main part configuration of the second embodiment. In FIG. 14, a block moving unit 78 is added to the controller 5 shown in FIG. 9. The other components are the same as those shown in FIG. 9. Therefore, redundant explanation of the components is omitted.

The block moving unit 78 performs processing for releasing the active blocks AB from an active block list corresponding to a plane in which free blocks decrease and supplying the released blocks to an FB list. The block moving unit 78 has list position information 79 for recording to which free block list the processing is applied.

In the second embodiment, an overall procedure of writing processing is the same as the procedure explained with reference to FIG. 11. Therefore, redundant explanation of the procedure is omitted. A procedure of data moving processing in the block moving unit 78 is explained below according to FIG. 15.

First, the block moving unit 78 sets the position information P of the list position information 79 to 0 (step S500). The block moving unit 78 determines whether the number of free blocks remaining in the FB list (P) corresponding to the position information P is equal to or larger than R−1 (step S510). When the number of free blocks remaining in the FB list (P) is equal to or larger than R−1, the block moving unit 78 acquires, from the AB list (P) of the same position information P, the active block AB in which oldest data is stored (step S520). The block moving unit 78 deletes the acquired active block AB from the AB list (P) (step S530).

The block moving unit 78 reads out stored data of the acquired active block AB to the work area of the RAM 20 (step S540). The block moving unit 78 designates normal priority and requests the free-block selecting unit 71 to select one free block. The normal-priority-list selecting unit 74 selects one free block FB according to the procedure shown in FIG. 12. In the FB list selection in the normal-priority-list selecting unit 74, as explained above, an FB list in which the number of remaining free blocks is not equal to or larger than R is not selected. Therefore, the normal-priority-list selecting unit 74 selects a free block from an FB list different from the FB list for which the determination at step S510 is NO. The normal-priority-list selecting unit 74 notifies the block moving unit 78 of a block identifier of the selected free block (step S550).

The block moving unit 78 writes the stored data of the active block AB read out to the work area of the RAM 20 in the free block, the block identifier of which is notified (step S560). The block moving unit 78 links, as a free block, the active block AB of the position information P selected at step S520 to the FB list (P) having the same position information P (step S570). The block moving unit 78 links the free block FB acquired at step S550 to an FB list corresponding to a plate to which the free block belongs (step S580). The block moving unit 78 determines again whether the number of free blocks remaining in the FB list (P) corresponding to the same position information P is equal to or larger than R−1 (step S510). When the number of free blocks remaining in the FB list (P) is not equal to or larger than R−1, the block moving unit 78 repeats the processing at steps S520 to S580 until the determination at step S510 changes to YES.

When it is determined at step S510 that the number of remaining free blocks is equal to or larger than R−1, for example, the block moving unit 78 increments the position information P by one and updates the position information P to the next position (step S590). The block moving unit 78 determines whether the position information P reaches the last position of the FB list (step S600). The block moving unit 78 repeats the processing until the position information P reaches the last position of the FB list. When the position information P reaches the last position of the FB list, the block moving unit 78 ends the processing.

In the selection of an active block at step S520, when it can be predicted that the selected oldest active block AB is a block just written, i.e., a period from a point when data is written to the present is shorter than a predetermined time, the block moving unit 78 can also select an active block from an AB list having another kind of position information P without selecting the active block AB. In other words, in an AB list in which it is predicted that an active block is released in a short period, it is expected that free blocks increase unless data movement processing among lists is performed. Therefore, in the selection of an active block at step S520, the block moving unit 78 can also stop the selection for the active block list and shift the procedure to step S590. The prediction can be performed by a method explained below.

A sequence count C incremented by 1 every time an active block list is updated is given to the active block list and, when data is written in a free block and linked to the active block list, the count C at that point is linked to the block. The count C linked to a certain block b is described as BC(b) below. As a difference between the count C and BC(AB) of the oldest block AC in the active block list is smaller, the active block AB can be determined as being written more recently. For example, when all blocks of a certain plane are used in order, the difference is equal to the length of the active block list.

Therefore, when the oldest active block AB is selected, the block moving unit 78 compares BC(AB) and the count C of the active block list and, when the difference is equal to or smaller than a threshold, determines that the active block AB is written recently, skips release of the active block from the active block list, and shifts to step S590. As the threshold, for example, a value obtained by multiplying the length of the active block list with a fixed coefficient can be used.

As explained above, in the second embodiment, data of an active block of an active block list corresponding to a free block management list in which the number of free blocks is smaller than the threshold (R−1) is moved to a free block selected from a free block management list in which the number of free blocks is equal to or larger than the threshold R. Therefore, free blocks are supplied to a free block list including a small number of free blocks. It is possible to prevent the number of free blocks from being biased among the free block lists and always secure R or more spare blocks in each of the free block lists. Even in the dynamic block allocation system, deterioration in sequential write performance less easily occurs.

Figure 15:
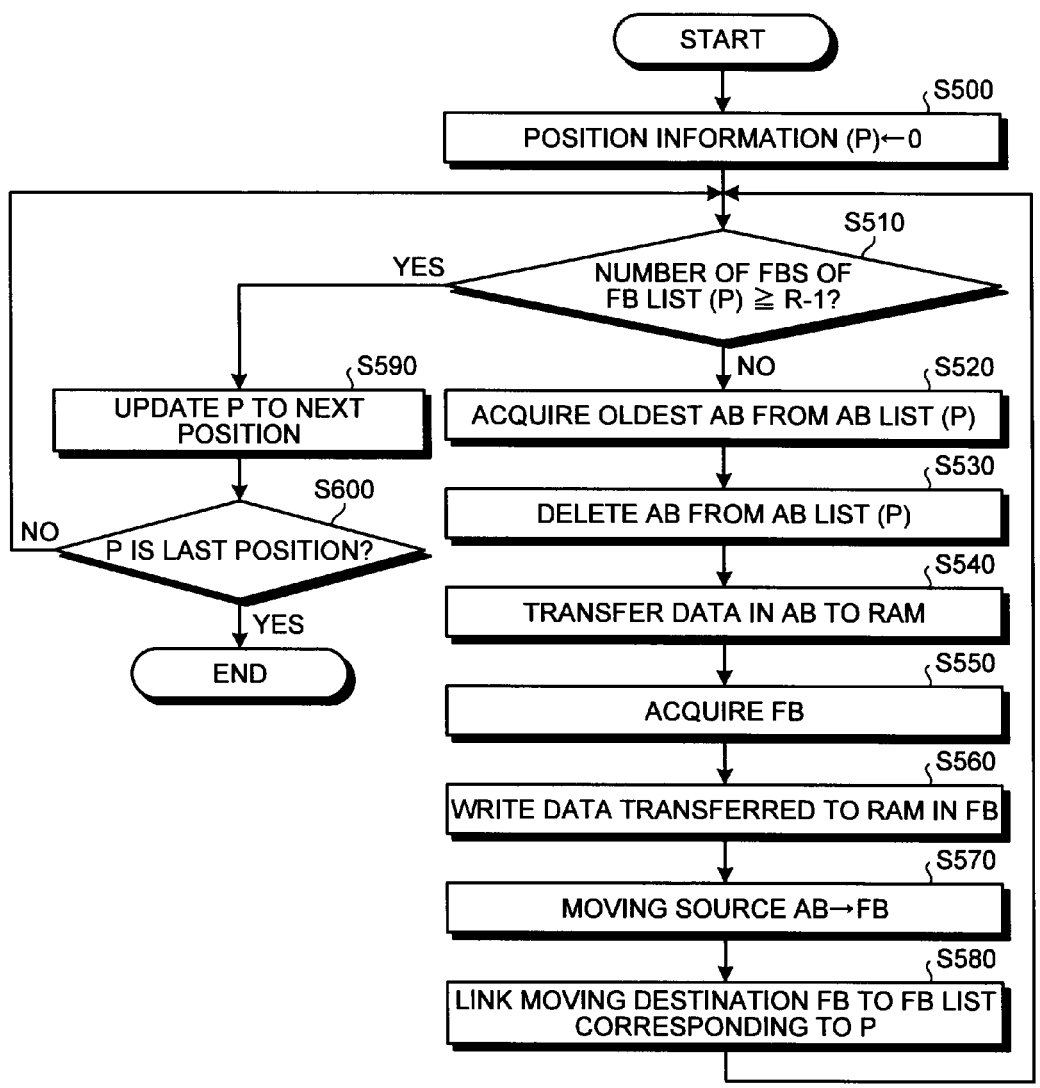
FIG. 15 is a flowchart of an operation procedure of a second embodiment.

At step S510 in FIG. 15, R−1 is used as the threshold. However, the threshold can also be another numerical value smaller than R. In this case, the number of spare blocks always secured in each of the free block lists is also smaller than R.

The block moving unit 78 can also perform the data movement processing making use of time when there is no access from the host 1 or can also more preferentially perform the data movement processing than other processing when the block moving unit 78 detects that the number of free blocks decreases to be smaller than R−1 in an FB list corresponding to any one of the planes.

In the first and second embodiments, the NAND memory 10 can perform channel parallel operation with a plurality of channels. However, the NAND memory 10 and the drive control circuit 4 can also be connected by a single channel. In the first and second embodiments, a logical block includes a plurality of physical blocks 1 and a free block list is managed in a logical block unit. However, the free block list can also be managed in a logical block unit without forming the logical block.

In the first and second embodiments, a free block list is classified into a plurality of free block lists by using channels, banks, chips, and planes. However, the free block list can also be classified into a plurality of free blocks by using one or more of the channels, the banks, the chips, and the planes according to specifications of a nonvolatile semiconductor memory. Classification units for the free block list are not limited to the channels, the banks, the chips, and the planes. Other arbitrary set units can also be used as long as blocks can be caused to operate in parallel.

In the first and second embodiments, free block selection at high priority or normal priority is performed according to whether data is high-density data or low-density data. However, switching selection for high priority or normal priority can also be performed based on other selection references. For example, if the host 1 can add information for designating the sequential write or the random write in writing, the switching selection can also be performed by determining that the free block selection is the high priority when the sequential write is designated and the free block selection is the normal priority when the random write is designated.

For example, concerning data known in advance as having small size such as a log as change difference information of a management table, the data can also be determined as the normal priority. When high data transfer speed is required, for example, when data is saved from the write buffer 21 to the NAND memory 10 because the SSD 100 enters a standby mode, all the data can also be determined as the high priority. In the first and second embodiments, management of free block lists is performed at the two kinds of priority of the high priority and the low priority. However, priority can also be divided into three or more kinds and managed.

Figure 16:
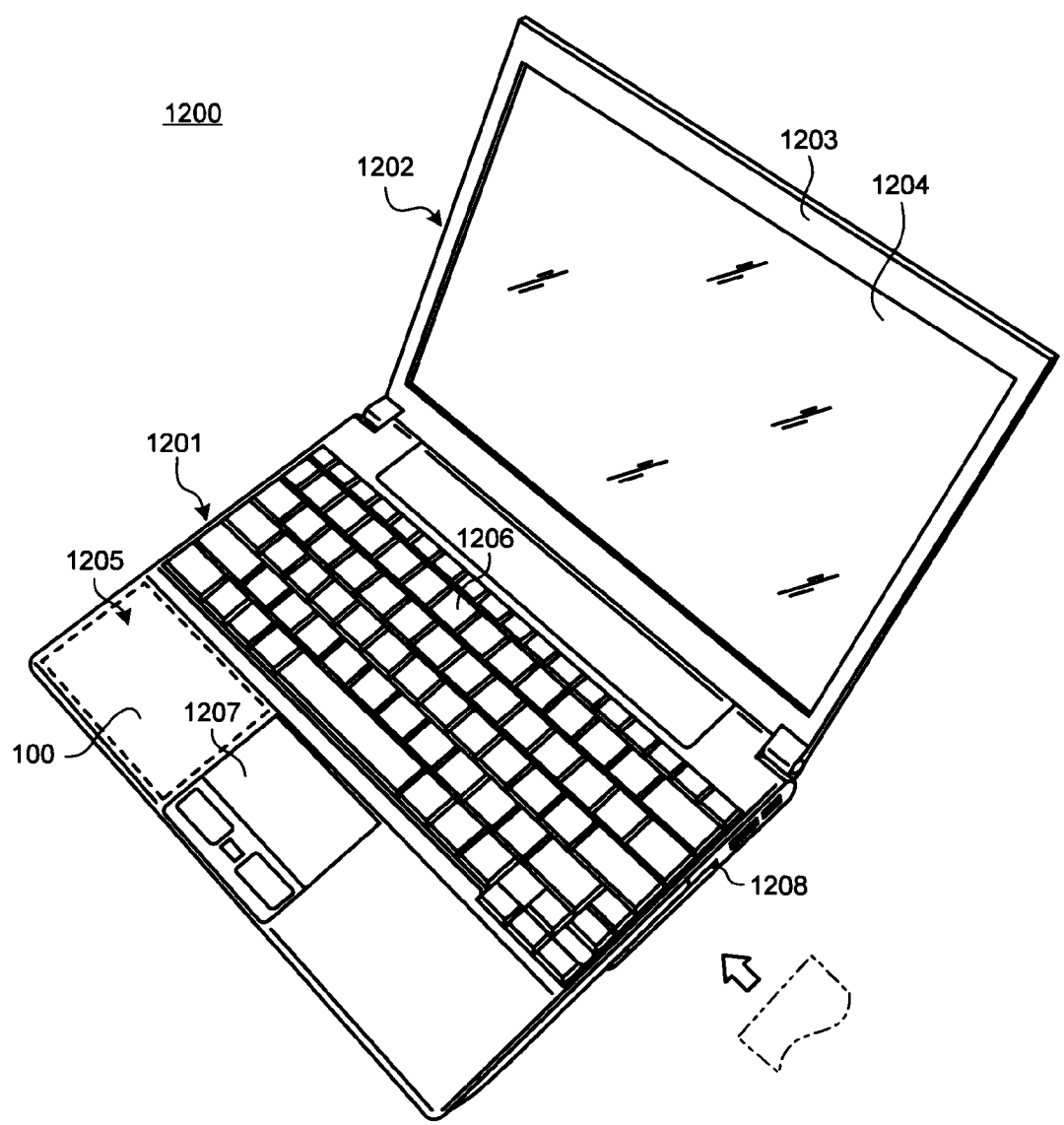
FIG. 16 is a perspective view of an external appearance of a personal computer.

FIG. 16 is a perspective view of an example of a PC 1200 on which the SSD 100 is mounted. The PC 1200 includes a main body 1201 and a display unit 1202. The display unit 1202 includes a display housing 1203 and a display device 1204 accommodated in the display housing 1203.

The main body 1201 includes a chassis 1205, a keyboard 1206, and a touch pad 1207 as a pointing device. The chassis 1205 includes a main circuit board, an optical disk device (ODD) unit, a card slot, and the SSD 100.

The card slot is provided so as to be adjacent to the peripheral wall of the chassis 1205. The peripheral wall has an opening 1208 facing the card slot. A user can insert and remove an additional device into and from the card slot from outside the chassis 1205 through the opening 1208.

The SSD 100 can be used instead of a conventional hard disk drive (HDD) in the state of being mounted on the PC 1200 or can be used as an additional device in the state of being inserted into the card slot.

Figure 17:
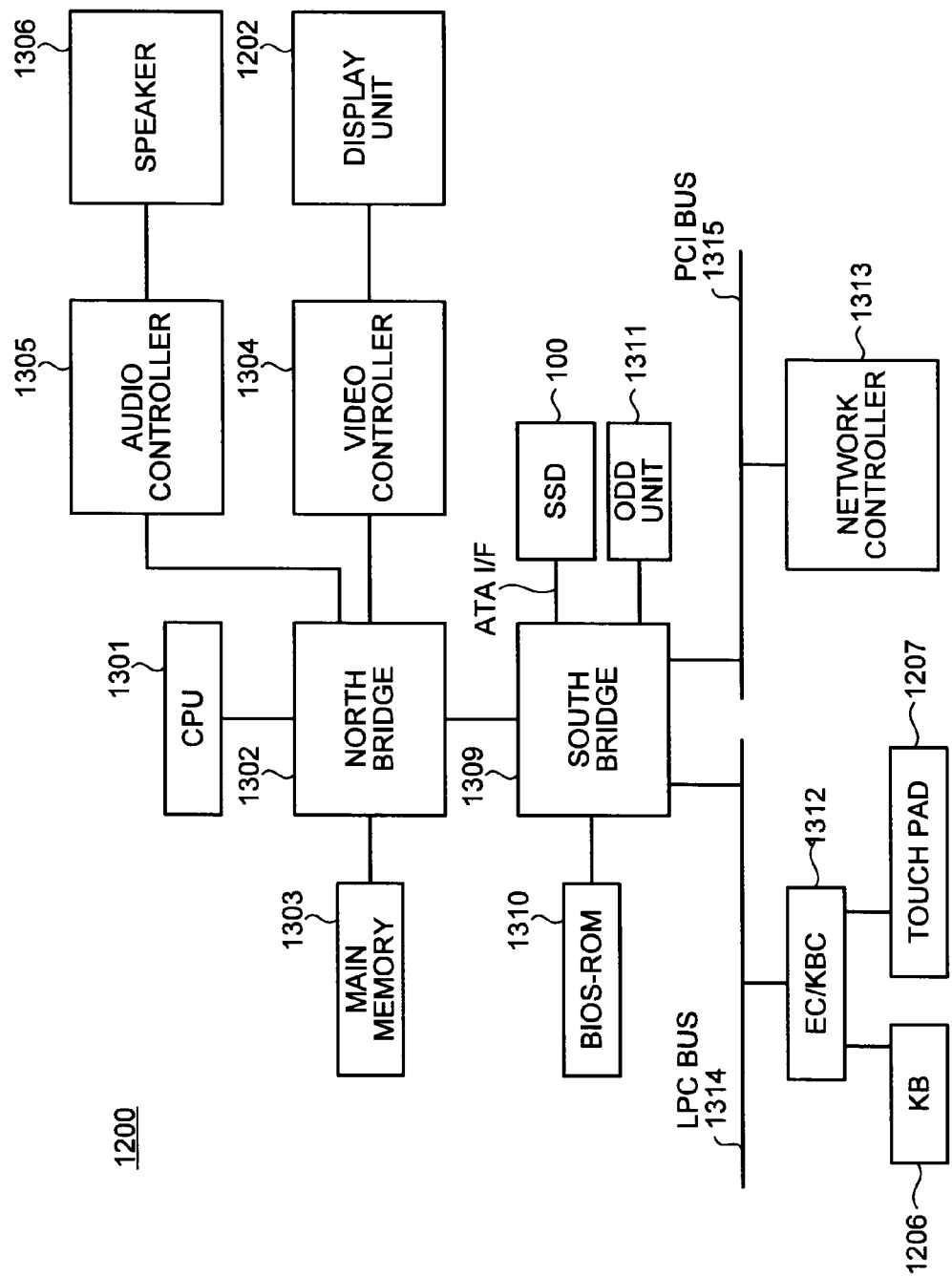
FIG. 17 is a diagram of an example of a functional configuration of the personal computer.

FIG. 17 is a schematic diagram of a system configuration example of the PC 1200 on which the SSD 100 is mounted. The PC 1200 includes a CPU 1301, a north bridge 1302, a main memory 1303, a video controller 1304, an audio controller 1305, a south bridge 1309, a basic input/output system read-only memory (BIOS-ROM) 1310, the SSD 100, an ODD unit 1311, an embedded controller/keyboard controller IC (EC/KBC) 1312, and a network controller 1313.

The CPU 1301 is a processor for controlling an operation of the PC 1200, and executes an operating system (OS) loaded from the SSD 100 onto the main memory 1303. Furthermore, when the ODD unit 1311 is capable of executing at least one of read processing and write processing on a mounted optical disk, the CPU 1301 executes the processing.

Moreover, the CPU 1301 executes a system BIOS stored in the BIOS-ROM 1310. The system BIOS is a computer program for controlling a hardware of the PC 1200.

The north bridge 1302 is a bridge device that connects a local bus of the CPU 1301 to the south bridge 1309. The north bridge 1302 has a memory controller for controlling an access to the main memory 1303.

Moreover, the north bridge 1302 has a function of executing a communication with the video controller 1304 and a communication with the audio controller 1305 through an accelerated graphics port (AGP) bus and the like.

The main memory 1303 temporarily stores therein a computer program and data, and functions as a work area of the CPU 1301. The main memory 1303, for example, consists of a DRAM.

The video controller 1304 is a video reproduction controller for controlling the display unit 1202 used as a display monitor of the PC 1200.

The audio controller 1305 is an audio reproduction controller for controlling a speaker 1306 of the PC 1200.

The south bridge 1309 controls each device on a low pin count (LPC) bus 1314 and each device on a peripheral component interconnect (PCI) bus 1315. Moreover, the south bridge 1309 controls the SSD 100 that is a memory device storing various types of software and data through the ATA interface.

The PC 1200 accesses the SSD 100 in sector units. A write command, a read command, a cache flush command, and the like are input to the SSD 100 through the ATA interface.

The south bridge 1309 has a function of controlling an access to the BIOS-ROM 1310 and the ODD unit 1311.

The EC/KBC 1312 is a one-chip microcomputer in which an embedded controller for power management and a keyboard controller for controlling the keyboard 1206 and the touch pad 1207 are integrated.

The EC/KBC 1312 has a function of turning on/off the PC 1200 based on an operation of a power button by a user. The network controller 1313 is, for example, a communication device that executes communication with an external network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile semiconductor memory including a plurality of blocks as a unit of data erasing; and
a controller including a block selecting unit that selects, in writing data in the nonvolatile semiconductor memory, a required number of free blocks not including valid data from the nonvolatile semiconductor memory and a writing control unit that writes data in the selected free blocks, wherein
the block selecting unit includes:
a list unit in which free blocks included in the nonvolatile semiconductor memory are classified into a plurality of free block management lists using a set unit of blocks operable in parallel;

a first free-block selecting unit that operates to acquire, in acquiring a first free block at normal priority, the first free block from a free block management list in which a number of free blocks is larger than a first threshold; and a second free-block selecting unit that operates to acquire, in acquiring a second free block at high priority, the second free block from the free block management list in which a number of free blocks is larger than the first threshold and a free block management list in which a number of free blocks is not larger than the first threshold.

2. The memory system according to claim 1, wherein the first free-block selecting unit operates when low-density data in which a ratio of valid data in a predetermined logical address range is smaller than a predetermined ratio is written in the nonvolatile semiconductor memory, and the second free-block selecting unit operates when high-density data in which a ratio of valid data in the predetermined logical address range is larger than the predetermined ratio is written in the nonvolatile semiconductor memory.

3. The memory system according to claim 2, wherein the plurality free block management lists are used to manage free blocks by a logical block unit associated with one or more of the plurality of blocks.

4. The memory system according to claim 3, further comprising a cache memory, wherein the controller includes a managing unit that allocates a storage area of the nonvolatile semiconductor memory to first and second management storage areas by the logical block unit, the writing control unit performs first flushing for flushing a plurality of data in a sector unit written in the cache memory to the first management storage area as data in a first management unit and second flushing for flushing a plurality of data in a sector unit written in the cache memory to the second management storage area as data in a second management unit twice or larger natural number times as large as the first management unit, and the writing control unit writes, in performing the first flushing, the low-density data in the free block acquired by the first free-block selecting unit and writes, in performing the second flushing, the high-density data in the free block acquired by the second free-block selecting unit.

5. The memory system according to claim 4, wherein the nonvolatile semiconductor memory includes a plurality of channel parallel operation elements including a plurality of memory chips, each of the memory chips is divided into a plurality of planes operable in parallel, each of the planes includes a plurality of the plurality of blocks, and the memory chips in the respective channel parallel operation elements are divided into a plurality of banks, which respectively shares a ready/busy signal, over the channel parallel operation elements;

the block selecting unit manages the free blocks based on logical blocks associated with a plurality of blocks selected from the channel parallel operation elements, the writing control unit controls parallel operation by the planes, the banks, or the channel parallel operation elements, and the free block management lists are classified by the logical blocks having a same bank number, a same chip number, and a same plane number.

6. The memory system according to claim 3, wherein the first and second free-block selecting units select a required number of free block management lists from the plurality of free block management lists using round robin weighted by a number of logical blocks entered in the plurality of free block management lists.

7. The memory system according to claim 3, wherein the first and second free-block selecting units select a required number of free block management list from the plurality of free block management lists using round robin weighted by a number of logical blocks usable as free blocks or active blocks that are blocks including valid data.

8. The memory system according to claim 1, wherein, in the plurality of free block management lists, if combination of the set unit of the blocks operable in parallel are limited, when the first or second free-block selecting unit sequentially acquires free blocks from each of the free block management lists according to a predetermined order rule, a free block management list inoperable in parallel with the free block management list is farther away from a free block management list concerning the order rule than a free block management list operable in parallel with the free block management lists.

9. The memory system according to claim 1, further comprising a spare-block-information storing unit that stores the first threshold that is a number of free blocks secured as spare blocks in a free block management list, wherein the first free-block selecting unit operates not to acquire the first free block from a free block management list in which a number of free blocks is smaller than the first threshold stored in the spare-block-information storing unit, and the second free-block selecting unit acquires a free block from a free block management list in which a number of free blocks is smaller than the first threshold stored in the spare-block-information storing unit and a free block management list in which a number of free blocks is equal to or larger than the first threshold stored in the spare-block-information storing unit.

10. The memory system according to claim 9, wherein the first threshold stored in the spare-block-information storing unit is variably set respectively in a free block management list according to a number of bad blocks included in each of the free block management lists.

11. The memory system according to claim 1, wherein the first and second free-block selecting units acquire free blocks from free block management lists to secure a number of free blocks requested by the writing control unit.

12. The memory system according to claim 1, wherein the first and second free-block selecting units select a required number of free block management lists from the plurality of free block management lists using round robin weighed by a value inversely corresponding to a number of bad blocks.

13. The memory system according to claim 1, wherein the list unit further includes a plurality of active block management lists in which active blocks as blocks including valid data included in the nonvolatile semiconductor memory are classified by using a set unit of the blocks, and the memory system further comprises a block moving unit that moves data of an active block of an active block management list corresponding to a free block management list in which a number of free blocks is smaller than a second threshold to a free block of a free block management list in which a number of free blocks is larger than a third threshold equal to or larger than the second threshold.

14. The memory system according to claim 13, wherein the block moving unit performs the movement until a number of free blocks increases to be equal to or larger than the second threshold.

15. The memory system according to claim 14, wherein the block moving unit preferentially selects, in the movement, an active block in which older data is stored from an active block management list.

16. The memory system according to claim 15, wherein, when a period from a point when data is written in the selected active block to a present is smaller than a predetermined threshold, the block moving unit does not select the active block in which older data is stored and select an active block from another active block management list.

17. The memory system according to claim 13, wherein the block moving unit causes, in the movement, the first free-block selecting unit to select a free block of the free block management list in which a number of free blocks is larger than the third threshold equal to or larger than the second threshold and moves data of an active block to the free block selected by the first free-block selecting unit.

18. The memory system according to claim 13, wherein the block moving unit registers an active block, data of which is moved to a free block of a free block management list, in the free block management list corresponding to the registered active block as a free block.

19. A method of controlling a memory system including a nonvolatile semiconductor memory including a plurality of blocks as a unit of data erasing and a controller that selects, in writing data in the nonvolatile semiconductor memory, a required number of free blocks not including valid data from the nonvolatile semiconductor memory and writes data in the selected free blocks, the method comprising:
classifying free blocks included in the nonvolatile semiconductor memory into a plurality of free block management lists using a set unit of blocks operable in parallel;
acquiring, in acquiring a first free block at normal priority, the first free block from a free block management list in which a number of free blocks is larger than a first threshold; and
acquiring, in acquiring a second free block at high priority, the second free block from the free block management list in which a number of free blocks is larger than the first threshold and a free block management list in which a number of free blocks is not larger than the first threshold.

20. The method of controlling a memory system according to claim 19, further comprising:
acquiring a free block at the normal priority when low-density data in which a ratio of valid data in a predetermined logical address range is smaller than a predetermined ratio is written in the nonvolatile semiconductor memory; and
acquiring a free block at the high priority when high-density data in which a ratio of valid data in the predetermined logical address range is larger than the predetermined ratio is written in the nonvolatile semiconductor memory.

21. The method of controlling a memory system according to claim 20, further comprising managing free blocks by a logical block unit associated with one or more of the plurality of blocks to thereby manage the plurality of free block management lists.

22. The method of controlling a memory system according to claim 21, wherein
the memory system further includes a cache memory,
the controller allocates a storage area of the nonvolatile semiconductor memory to first and second management storage areas by the logical block unit, and
the method further comprises:
performing first flushing for flushing a plurality of data in a sector unit written in the cache memory to the first management storage area as data in a first management unit and second flushing for flushing a plurality of data in a sector unit written in the cache memory to the second management storage area as data in a second management unit twice of large natural number times as large as the first management unit; and
writing, in performing the first flushing, the low-density data in the free block acquired at the normal priority and writing, in performing the second flushing, the high-density data in the free block acquired at the high priority.

23. An information processing apparatus comprising:
a central processing unit;
a main storage memory; and
an external storage device, wherein
the external storage device includes:
a nonvolatile semiconductor memory including a plurality of blocks as a unit of data erasing; and
a controller including a block selecting unit that selects, in writing data in the nonvolatile semiconductor memory, a required number of free blocks not including valid data from the nonvolatile semiconductor memory and a writing control unit that writes data in the selected free blocks, and
the block selecting unit includes:
a list unit in which free blocks included in the nonvolatile semiconductor memory are classified into a plurality of free block management lists using a set unit of blocks operable in parallel;
a first free-block selecting unit that operates to acquire, in acquiring a first free block at normal priority, the first free block from a free block management list in which a number of free blocks is larger than a first threshold; and
a second free-block selecting unit that operates to acquire, in acquiring a second free block at high priority, the second free block from the free block management list in which a number of free blocks is larger than the first threshold and a free block management list in which a number of free blocks is not larger than the first threshold.

* * * * *